(12) United States Patent
Fujikawa

(10) Patent No.: US 8,102,497 B2
(45) Date of Patent: Jan. 24, 2012

(54) DISPLAY DEVICE

(75) Inventor: Yohsuke Fujikawa, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/805,622

(22) Filed: Aug. 10, 2010

(65) Prior Publication Data

US 2011/0025971 A1 Feb. 3, 2011

Related U.S. Application Data

(62) Division of application No. 11/921,931, filed as application No. PCT/JP2006/311591 on Jun. 9, 2006, now Pat. No. 7,812,914.

(30) Foreign Application Priority Data

Sep. 26, 2005 (JP) .................................. 2005-278013

(51) Int. Cl.
*G02F 1/1345* (2006.01)
(52) U.S. Cl. ......................................... 349/151; 257/59
(58) Field of Classification Search .................. None
See application file for complete search history.

(56) References Cited

U.S. PATENT DOCUMENTS

| | | | |
|---|---|---|---|
| 7,196,353 B2* | 3/2007 | Murade | 257/59 |
| 7,812,914 B2* | 10/2010 | Fujikawa | 349/151 |
| 2003/0020067 A1* | 1/2003 | Chung et al. | 257/72 |
| 2003/0142043 A1 | 7/2003 | Matsueda | |
| 2004/0105140 A1 | 6/2004 | Fujita | |
| 2004/0246435 A1 | 12/2004 | Kamei | |
| 2005/0078232 A1 | 4/2005 | Lo et al. | |
| 2005/0184980 A1* | 8/2005 | Sato et al. | 345/204 |
| 2005/0275771 A1 | 12/2005 | Matsueda | |
| 2005/0280766 A1 | 12/2005 | Johnson et al. | |
| 2006/0055660 A1* | 3/2006 | Teranishi | 345/102 |

FOREIGN PATENT DOCUMENTS

| | | |
|---|---|---|
| JP | 01-167822 | 7/1989 |
| JP | 03-107127 | 5/1991 |
| JP | 04-053923 | 2/1992 |
| JP | 09-090411 | 4/1997 |
| JP | 09-288284 | 11/1997 |
| JP | 11-052427 | 2/1999 |
| JP | 2000-292805 | 10/2000 |
| JP | 2001-075108 | 3/2001 |
| JP | 2001-188228 | 7/2001 |
| JP | 2003-098540 | 4/2003 |
| JP | 2004-252128 | 9/2004 |

* cited by examiner

*Primary Examiner* — Tina Wong
(74) *Attorney, Agent, or Firm* — Harness, Dickey & Pierce, P.L.C.

(57) ABSTRACT

The present invention realizes a display device with dummy pixel portions and a frame region required for the dummy pixel portions and code notation, in which the frame region is minimized while achieving code notation in required size.
In a dummy pixel portion (122) of the present display device, the number of gate electrodes in a thin film transistor formed by a semiconductor layer (11) is reduced to two, so that distances from a contact hole (12) to another contact hole (13) and to a through-hole (14) can be shortened as compared to those in pixel formation portions (112*a*, 112*b*), making it possible to dispose the contact hole (13) and the through-hole (14) in a lower portion in the figure. In addition, provided in the vicinity of the center of the dummy pixel portion (122) is only an electrode equivalent to a storage capacitance line (170). Thus, a wide transparent region can be ensured to note a code (22) of a sufficient size in the dummy pixel portion (122).

24 Claims, 13 Drawing Sheets

DISPLAY DEVICE

PRIORITY STATEMENT

This application is a divisional application of U.S. application Ser. No. 11/921,931, filed Dec. 11, 2007 now U.S. Pat. No. 7,812,914, which is a national phase application of International Patent Application No. PCT/JP2006/311591, filed Jun. 9, 2006, which claims priority to JP Application No. 2005-278013 filed Sep. 26, 2005, the entire contents of U.S. application Ser. No. 11/921,931, International Patent Application No. PCT/JP2006/311591, and JP Application No. 2005-278013 are incorporated herein by reference in their entirety.

TECHNICAL FIELD

The present invention relates to display devices, and more specifically to a display device in which liquid crystal elements or EL (electro luminescence) elements are disposed in the form of a matrix.

BACKGROUND ART

In recent years, flat-panel display devices as typified by liquid crystal display devices have been in practical use, and mounted in a variety of types of electronic equipment, in particular mobile electronic equipment. Widely-used flat-panel liquid crystal display devices are thin liquid crystal display devices of active matrix type capable of high-resolution display.

FIG. 11 is a view schematically illustrating the structure of such a conventional active matrix liquid crystal display device. The active matrix liquid crystal display device is composed of two boards having a liquid crystal layer sandwiched therebetween, in which an element board 100, one of the two boards, has disposed thereon in the form of a lattice a plurality of unillustrated source bus lines and a plurality of unillustrated gate bus lines, which respectively act as video signal lines and scanning signal lines, and the board also has a plurality of pixel formation portions disposed in the form of a matrix, at their respective intersections between the source bus lines and the gate bus lines. The pixel formation portions constitute a display portion of the device, and each pixel formation portion includes a TFT (thin film transistor) and pixel electrodes, the TFT being a switching element having a gate terminal connected to the gate bus line, and a source terminal connected to the source bus line, the pixel electrodes being connected to a drain terminal of the TFT. The element board 100 including the pixel formation portions is also referred to as a "TFT board". In addition, a counter board 200, the other of the two boards that is opposed to the element board 100, has a common electrode and a color filter (CF) provided thereon, the common electrode being an unillustrated counter electrode commonly provided for the pixel formation portions, the color filter being intended to form display colors. This board is also referred to as a "CF board".

Such an active matrix liquid crystal display device includes: a source driver (column control circuit) 130 for driving the source bus lines of the display portion; a gate driver (row control circuit) 140 for driving the gate bus lines of the display portion; an unillustrated common electrode drive circuit for driving the common electrode; and an unillustrated display control circuit for controlling the source driver, the gate driver, and the common electrode drive circuit. In recent years, it is often the case that, of the above elements, at least the source driver 130 and the gate driver (column control circuit) 140 are each composed of polysilicon thin film transistors, and disposed in a frame region 120 on the element board 100, which is provided around a display region 110 in which the pixel formation portions are disposed. The configurations of the display region 110 and the frame region 120 will be described next with reference to FIGS. 12 and 13.

FIG. 12 is an enlarged top view illustrating a detailed configuration of a portion of the element board 100 that is included in the area encircled by circle A shown in FIG. 11. FIG. 12 shows two pixel formation portions 111a and 111b, which are provided in the display region 110 and have the same configuration, a dummy pixel portion 901, which is provided in the frame region 120 and has the same configuration as those of the pixel formation portions 111a and 111b, and a code notation portion 902 in which a code 21 and predetermined wiring are provided.

As shown in FIG. 12, the display region 110 has a plurality of gate bus lines 150, which are disposed along display rows at predetermined intervals in the vertical direction of the figure, and a plurality of source bus lines 160, which are disposed along display columns at predetermined intervals in the horizontal direction of the figure.

The gate bus line 150 is connected to gate terminals of thin film transistors, which are respectively included in the pixel formation portions 111a and 111b and the dummy pixel portion 901, while the source bus line 160 is connected to a source terminal of a corresponding one of the thin film transistors via a contact hole 12.

Note that the thin film transistor is formed by a semiconductor layer 11, and in this case, a gate electrode of the thin film transistor formed by the semiconductor layer 11 is divided into three portions as shown in FIG. 12. By dividing the gate electrode into a plurality of portions in such a manner, it becomes possible to reduce OFF-current in the transistor, and thereby to improve the ability to hold a written potential at a predetermined value.

In addition, a drain terminal of the thin film transistor extends out of a contact hole 13 toward a display surface of the element board 100 (a surface facing the counter board 200) before being connected via a through-hole 14 to a transparent electrode 16 and a reflective electrode 17, which serve as pixel electrodes. Such a layered structure will be described later.

Note that this display device is a so-called semi-transmissive display device, in which a display (hereinafter, referred to as a "transmissive display") using transmissive light from an unillustrated backlight illumination device, which is positioned opposite to the counter board 200 with respect to the element board 100, is effected simultaneously with a display (hereinafter, referred to as a "reflective display") using outside light incident from the outside of the device through the counter board 200. The semi-transmissive display device is capable of providing a readily-viewable display by effecting the transmissive display mainly in a dark place, whereas effecting the reflective display mainly in a bright place. Accordingly, the pixel electrodes as described include both the transparent electrodes 16 for the transmissive display and the reflective electrodes 17 for the reflective display, but the display device may include only pixel electrodes of either type.

A storage capacitance portion 15, which is also referred to as an "auxiliary capacitance", is additionally provided to hold the potentials of the pixel electrodes. One of two electrodes included in the storage capacitance portion 15 (which is provided at the side opposite to the counter board 200) linearly extends as a storage capacitance line 170 out of the display region 110 and passes through the frame region 120 in the row direction.

A repair portion 18, which is composed of a pair of electrodes having a predetermined insulating layer sandwiched therebetween, is provided to repair any defect of the pixel formation portion that has occurred during manufacture. For example, if a predetermined potential from the source bus line 160 cannot be written onto the pixel electrode for such a reason that the thin film transistor in the pixel formation portion has been disconnected during manufacture, such a defective pixel formation portion is undesirable because it appears as a bright spot (in the case of a normally-white-type display device). Therefore, the pair of electrodes included in the repair portion 18 are fused together by irradiating them with laser or suchlike, making it possible to electrically connect the pixel electrode to the source bus line. As a result, the defective pixel formation portion that appears as a bright spot is turned into a black spot, making it possible to make the display defect less noticeable.

The dummy pixel portion 901 is identical in configuration and size to the pixel formation portions 111a and 111b, but it does not form a pixel (i.e., it is not used for effecting a display). In general, such dummy pixel portions are disposed in a position corresponding to a display row or column adjacent to the periphery of the display region 110. The dummy pixel portions prevent: (1) breakage of the pixel formation portions due to static charge; (2) lighting with uneven brightness due to different parasitic capacitances in the pixel formation portions provided in the vicinity of the periphery of the display region 110; and (3) an abrupt change of the cell gap (height) between the vicinity of the periphery of the display region 110 and the frame region 120. Note that, in some cases, to further enhance such advantages of the dummy pixel portions, two or more dummy pixel portions are disposed together in the vicinity of one end of a single display row (or display column).

Since the structure of the semiconductor layer 11 for forming the thin film transistors is well-known, any detailed description thereof will be omitted herein, but layered structures of the element board 100 including the semiconductor layer 11 will be briefly described with reference to FIGS. 13A through 13D.

FIGS. 13A through 13D are schematic views illustrating the pixel formation portions 111a and 111b, the dummy pixel portion 901, and the code notation portion 902 in cross section taken along line A-A shown in FIG. 12. More specifically, FIG. 13A is a view illustrating an example where the code 21 in the code notation portion 902 is formed by a reflective electrode, FIG. 13B is a view illustrating an example where the code 21 is formed by a source electrode, FIG. 13C is a view illustrating an example where the code 21 is formed by a gate electrode, and FIG. 13D is a view illustrating an example where the code 21 is formed by a semiconductor layer.

As shown in FIG. 12, the code 21 is the number "111" provided in the frame region 120, indicating a display row or column number within the display region 110. This number is used for process management and analysis of the element board 100 or a liquid crystal cell.

Note that the code 21 is disposed so as to be viewable from the display surface side of the element board 100 (as shown in FIG. 12), or the code 21 may be disposed with the number being inverted, so that it is viewable through a glass substrate of the element board 100 from the side opposite to the display surface.

As shown in FIG. 13A, the code 21 can be made up of the same reflective electrode material as that for the reflective electrode 17 to increase visibility. However, light traveling toward the frame region 120 around the display region 110 might be blocked by a predetermined black matrix formed on the counter board 200, and therefore the same electrode material as that for the gate electrode, or the source electrode, which is a thin film made up of metal and having a light-blocking effect, is often used in order to ensure the visibility of the code 21, as well as to form the code 21 in an early stage.

Specifically, an unillustrated silicon thin film is first formed on a glass substrate 51 of the element board 100, and furthermore, after a gate insulating film 52 is formed thereon, gate electrodes and an interlayer insulating film 53 are formed. Thereafter, drain electrodes and source electrodes of thin film transistors are formed in contact holes that have been made to expose the silicon thin film. After a flattened layer 54 including a passivation film is further formed thereon, through-holes 14 and other holes are made. The transparent electrodes 16 made up of ITO (indium tin oxide) are formed above the holes, and the reflective electrodes 17 are then formed using a conductive material such as aluminum or silver. In the case of forming the code 21 using the reflective electrode, the formation is carried out in a rather late stage, and therefore the code 21 is often formed simultaneously with the source electrode as shown in FIG. 13B, or the gate electrode as shown in FIG. 13C, using the same material as that for the electrode. Furthermore, the code 21 may be formed simultaneously with the semiconductor layer 11, which is the aforementioned silicon thin film, as shown in FIG. 13D, using the same material as that for the semiconductor layer 11. Note that the silicon may be amorphous silicon.

Here, the code 21 can be made up of a thin-film material (e.g., a color filter) on the counter board 200, rather than on the element board 100. However, if the code is formed on the counter board 200 without considering the positions of various conductors and circuits that are to be formed on the element board 100, such conductors and circuits having a light blocking effect make it difficult to read the code on the counter board 200 through the glass substrate from the side opposite to the display surface of the element board 100. Also, in such a case, part or all of the code is often rendered impossible or hard to view even from the counter board 200 side. Therefore, it is preferable that the code 21 is disposed on the element board 100.

[Patent Document 1] Japanese Laid-Open Patent Publication No. 2004-163600

[Patent Document 2] Japanese Laid-Open Patent Publication No. 2000-292805

DISCLOSURE OF THE INVENTION

Problems to be Solved by the Invention

In order to ensure code readability, however, the code 21 is in general required to be about 0.01 to 0.1 mm in size, and in the case where the dummy pixel portion 901 and the code notation portion 902 including the code 21 are disposed in the frame region 120 on the element board 100 as shown in FIG. 12, the area of the frame region 120 is increased. In addition, even if the code 21 is formed on the counter board 200, in order to make the code 21 more viewable, an unused region equal in size to the code notation portion 902, where no conductors and circuits are disposed, is required in a portion of the frame region 120 that is vertically distanced from the portion where the code 21 is disposed. Therefore, even in this case, the area of the frame region 120 is increased as well.

The increase in size of the frame region 120 that is not involved in effecting displays only results in a larger overall display size, so that products having the display device mounted therein are rendered less attractive, and the number of display devices that can be manufactured from so-called mother glass from which to obtain a plurality of glass substrates as described above is decreased, leading to an increase in the manufacture cost.

In addition, in the case of forming the source driver 130 and the gate driver 140 in the frame region 120, as well as any circuit or component for implementing an additional function in the frame region 120, the frame region 120 is further increased in size. Specifically, it is preferable that the frame region 120 is as small as possible as described above, and therefore no wiring region is normally provided in the frame region 120 in order to lead around (or bend) the gate bus lines 150 and the source bus lines 160. Accordingly, the source driver 130 and the gate driver 140 that are to be formed in the frame region 120 are disposed in limited positions. For example, the gate driver 140 is limitedly disposed in a position almost in contact with the code notation portion 902 shown in FIG. 12. Consequently, it is not possible to conveniently change positions in which to dispose the source driver 130 and the gate driver 140, and thereby to make an extra region in which to form any circuit or component for implementing an additional function, without increasing the size of the frame region 120.

Therefore, an objective of the present invention is to provide a display device with dummy pixel portions and a frame region required for the dummy pixel portions and code notation, in which the frame region is minimized while achieving code notation in required size.

Solution to the Problems

A first aspect of the present invention is directed to a display device comprising an element board and a counter board, the element board including: a plurality of data signal lines for transmitting a plurality of data signals; a plurality of pixel formation portions disposed in a matrix form, the pixel formation portions being provided in a vicinity of their respective intersections between the plurality of data signal lines and a plurality of scanning signal lines crossing the data signal lines; and a plurality of dummy pixel portions, each being disposed adjacent to an outermost one of the pixel formation portions, the counter board being provided so as to be opposed to the element board, such that electro-optical elements for effecting a display are sandwiched between the counter board and the element board, wherein the dummy pixel portions each include at least one component equivalent to any one of a plurality of light blocking effect components for forming a predetermined circuit included in the pixel formation portions, and an area of the component included in the dummy pixel portion, when viewed from a position substantially vertically away from a principal surface of the element board, is smaller than that of each of the components included in the pixel formation portions.

In a second aspect of the present invention, based on the first aspect of the invention, the pixel formation portions each include any one or more of the following: a repair portion by which to change wiring in the circuit; a predetermined memory circuit; and a predetermined sensor circuit, and the dummy pixel portions include none of the following: the repair portion, the memory circuit, and the sensor circuit, as included in the pixel formation portions.

In a third aspect of the present invention, based on the first aspect of the invention, one of the components included in the pixel formation portions is a semiconductor layer for forming a predetermined first thin film transistor, and the component included in the dummy pixel portions is another semiconductor layer having a smaller area than that of the semiconductor layer, and the dummy pixel portions each include a second thin film transistor formed by the smaller semiconductor layer.

In a fourth aspect of the present invention, based on the third aspect of the invention, the first thin film transistor includes a plurality of gate electrodes, and the second thin film transistor includes a lesser number of gate electrodes than the number of gate electrodes in the first thin film transistor.

In a fifth aspect of the present invention, based on the first aspect of the invention, the pixel formation portions each include a storage capacitance portion having two electrodes for holding a potential in accordance with a signal supplied from a corresponding one of the data signal lines, and the dummy pixel portions each include only an electrode equivalent to one of the two electrodes included in the storage capacitance portion, the electrode being connected to one of the two electrodes included in a pixel formation portion adjacent to the dummy pixel portion.

In a sixth aspect of the present invention, based on the fifth aspect of the invention, the electrode included in the dummy pixel portions has a smaller width than that of the one of the two electrodes included in the pixel formation portion.

In a seventh aspect of the present invention, based on the first aspect of the invention, the dummy pixel portions each include a code notation portion in which to note a predetermined code, and the component included in the dummy pixel portions is disposed so as not to prevent notation of the code.

In an eighth aspect of the present invention, based on the seventh aspect of the invention, the components included in the pixel formation portions are a semiconductor layer, a gate electrode, and a source electrode that form a predetermined thin film transistor, and the notation of the code by the code notation portion is achieved by forming one of the following into a predetermined shape: another semiconductor layer simultaneously formed with the semiconductor layer; an electrode simultaneously formed with the gate electrode; and an electrode simultaneously formed with the source electrode.

In a ninth aspect of the present invention, based on the seventh aspect of the invention, one of the components included in the pixel formation portions is a reflective electrode for effecting a reflective display, and the notation of the code by the code notation portion is achieved by forming an electrode of a predetermined shape, simultaneously with the reflective electrode.

In a tenth aspect of the present invention, based on the first aspect of the invention, the counter board includes code notation portions in which to note a predetermined code within a region overlapping the dummy pixel portions when viewed from a position substantially vertically away from a principal surface of the counter board, and the component included in the dummy pixel portions is disposed so as not to prevent notation of the code.

In an eleventh aspect of the present invention, based on the first aspect of the invention, the dummy pixel portions are connected to either the data signal lines or the scanning signal lines, or both, and include a pad portion by which to externally input/output a predetermined signal to/from the device.

In a twelfth aspect of the present invention, based on the first aspect of the invention, the display device further comprises a data signal line drive circuit for supplying the plurality of data signals to their respective data signal lines, and the data signal line drive circuit is connected to conductors which are connected to their respective data signal lines, and extend out of an end of their respective dummy pixel portions after being bent at a predetermined angle in a direction in which the data signal lines extend.

In a thirteenth aspect of the present invention, based on the first aspect of the invention, the display device further comprises a scanning signal line drive circuit for supplying a predetermined selection signal to the scanning signal lines, and the scanning signal line drive circuit is connected to conductors, which are connected to their respective scanning signal lines, and extend out of an end of their respective dummy pixel portions after being bent at a predetermined angle in a direction in which the scanning signal lines extend.

EFFECT OF THE INVENTION

According to the first aspect of the invention, the area of the component included in the dummy pixel portions is smaller than that of each of the components included in the pixel formation portions, and therefore, for example, it is possible to note a code of a required size in the dummy pixel portions. Thus, it is possible to provide a display device with a reduced frame region required for the dummy pixel portions and code notation.

According to the second aspect of the invention, the repair portion, the memory circuit, or the sensor circuit, which is included in the pixel formation portions as their component, is not included in the dummy pixel portions, and therefore it is possible to reduce the area of the component included in the dummy pixel portions.

According to the third aspect of the invention, the semiconductor layer in the dummy pixel portions is smaller in area than that in the pixel formation portions, and therefore it is possible to further reduce the area of the component included in the dummy pixel portions, making it possible to conveniently change the position of the contact hole coupled to the semiconductor layer, for example.

According to the fourth aspect of the invention, the second thin film transistor included in the dummy pixel portions has a lesser number of gate electrodes than the number of gate electrodes in the first thin film transistor included in the pixel formation portions, and therefore it is possible to further reduce the area of the component included in the dummy pixel portions.

According to the fifth aspect of the invention, the dummy pixel portions each include only an electrode connected to one of the two electrodes included in the storage capacitance portion of the pixel formation portion adjacent thereto, so that there is no region where light is blocked by the other electrode, making it possible to further reduce the area of the light blocking effect component included in the dummy pixel portion.

According to the sixth aspect of the invention, the dummy pixel portions each include an electrode (e.g., a storage capacitance line electrode) having a smaller width than that of one of the electrodes included in the pixel formation portions, and therefore a region where light is blocked by that electrode is reduced in size, making it possible to further reduce the area of the light blocking effect component included in the dummy pixel portion.

According to the seventh aspect of the invention, the light blocking effect component included in the dummy pixel portions is disposed so as not to prevent code notation, and therefore it is possible to note a viewable code of a required size in the dummy pixel portions.

According to the eighth aspect of the invention, the code notation portions are formed simultaneously with the semiconductor layer, the gate electrode, or the source electrode, and therefore it is possible to note a viewable code of a required size in the dummy pixel portions, without increasing the manufacture cost.

According to the ninth aspect of the invention, the code notation portions are formed simultaneously with the reflective electrode, and therefore it is possible to note a viewable code of a required size in the dummy pixel portions, without increasing the manufacture cost.

According to the tenth aspect of the invention, the code notation portions are included in a region on the counter board that overlaps the dummy pixel portions, and the component included in the dummy pixel portions is disposed so as not to prevent code notation, making it possible to note viewable codes of a required size in the region overlapping the dummy pixel portions.

According to the eleventh aspect of the invention, the pad portion is included in the dummy pixel portions, and therefore it is possible to provide a display device with a reduced frame region required for providing the dummy pixel portions and the pad portions.

According to the twelfth aspect of the invention, the data signal line drive circuit is connected to the conductors that extend out of an end of their respective dummy pixel portions after being bent at a predetermined angle, resulting in an increased degree of freedom in layout of the data signal line drive circuit in the frame region. Thus, it is possible to add a new function without increasing the size of the display device.

According to the thirteenth aspect of the invention, the scanning signal line drive circuit is connected to the conductors that extend out of an end of their respective dummy pixel portions after being bent at a predetermined angle, resulting in an increased degree of freedom in layout of the scanning signal line drive circuit in the frame region. Thus, it is possible to add a new function without increasing the size of the display device.

DESCRIPTION OF THE REFERENCE CHARACTERS

Figure 1:
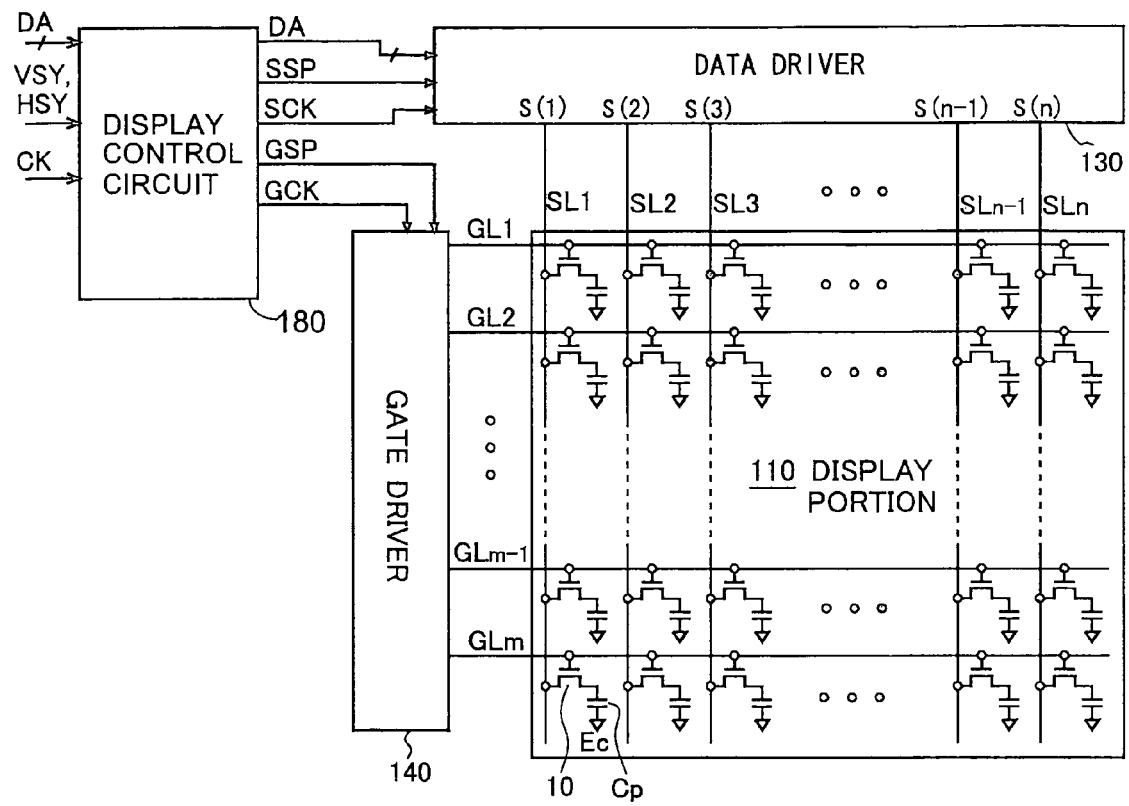
FIG. 1 is a block diagram illustrating the configuration of a liquid crystal display device according to an embodiment of the present invention, along with an equivalent circuit of a display portion thereof.

11 semiconductor layer
12,13 contact hole
14 through-hole
15 storage capacitance portion
16,76,86,96 transparent electrode
17,37,47,87,97 reflective electrode
18 repair portion
21 to 23, 26 to 29 code
51 glass substrate
52 gate insulating film
53 interlayer insulating film
54 flattened layer
70 pad portion
80 thin-film diode
81 upper electrode
82 lower electrode
100 element board
110 display region
111 to 114, 117 to 119 pixel formation portion
120 frame region
122,123,126,127,128,129 dummy pixel portion
130 source driver
140 gate driver
150 gate bus line
160 source bus line
170 storage capacitance line
180 display control circuit
200 counter board

BEST MODE FOR CARRYING OUT THE INVENTION

Hereinafter, an embodiment of the present invention and variants thereof will be described with reference to the accompanying drawings.

<1. Overall Configuration and Operation>

First, the configuration and operation of a liquid crystal display device according to an embodiment of the present invention will be described with reference to FIG. 1.

Figure 11:
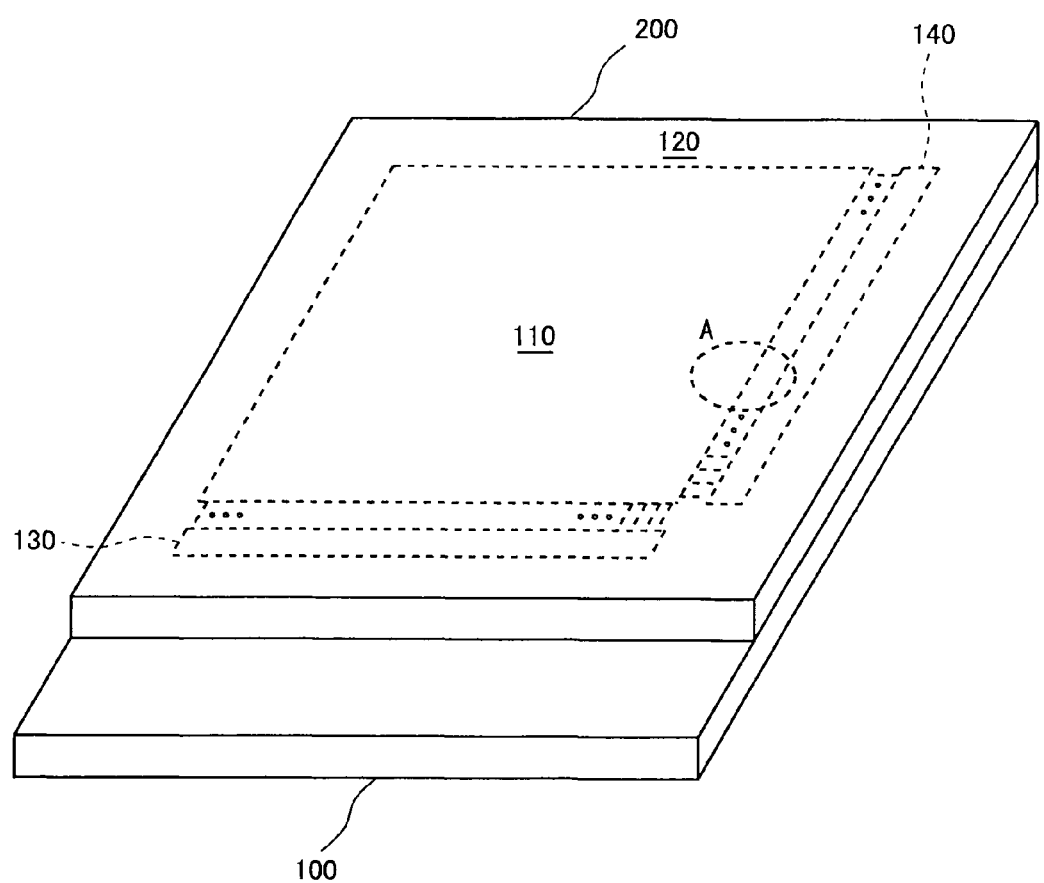
FIG. 11 is a view schematically illustrating the structure of a conventional active matrix liquid crystal display device.

FIG. 1 is a block diagram illustrating the configuration of the liquid crystal display device according to the present embodiment, along with an equivalent circuit of a display portion thereof. As shown in FIG. 1, the liquid crystal display device includes an active matrix display portion (display region) 110, a source driver 130 acting as a video signal line drive circuit, a gate driver 140 acting as a scanning signal line drive circuit, and a display control circuit 180 for controlling the source driver 130 and the gate driver 140. Since the overall structure of the display device is similar to the above-described structure shown in FIG. 11, the same elements are denoted by the same characters, and descriptions thereof will be omitted. Note that pixel formation portions included in the display device are not provided with any reflective electrode as will be described later, and therefore the display device effects only a transmissive display.

The display portion 110 includes: a plurality (m) of gate bus lines (also referred to as "gate lines") GL1 to GLm, which correspond to their respective horizontal scanning lines for an image represented by image data contained in a video signal received by the display control circuit 180 from an external signal source (not shown); a plurality (n) of source bus lines (also referred to as "data lines") SL1 to SLn, which cross each of the gate bus lines GL1 to GLm; and a plurality (m×n) of pixel formation portions provided at their respective intersections between the gate bus lines GL1 to GLm and the source bus lines SL1 to SLn.

The pixel formation portions are disposed in the form of a matrix to configure pixel arrays, and each pixel formation portion forms a predetermined color: red (R), green (G), or blue (B). Each pixel formation portion is composed of: a TFT (thin film transistor) 10, which is a switching element having a gate terminal connected to a gate bus line GLj passing through a corresponding one of the intersections, and a source terminal connected to a source bus line SLk passing through the intersection; a pixel electrode connected to a drain terminal of the TFT 10; a common electrode EC, which is a counter electrode commonly provided for the pixel formation portions; and a liquid crystal layer commonly provided for the pixel formation portions and disposed between the pixel electrode and the common electrode EC. A pixel capacitance Cp is composed of a storage capacitance portion (auxiliary capacitance), which includes a capacitance formed by the pixel electrode and the common electrode EC, as well as a predetermined storage capacitance line.

In the present embodiment, signals, such as an image data signal DA representing an image contained in a video signal that is to be displayed on a liquid crystal panel, a vertical synchronization signal VSY and a horizontal synchronization signal HSY, which are synchronization signals for the video signal, and a clock signal CK, are sent from the external signal source (not shown) to the display control circuit 180.

The display control circuit 180 receives the vertical synchronization signal VSY, the horizontal synchronization signal HSY, and the clock signal CK, and generates the following signals for causing the display portion 110 to effect a display: a source driver start pulse signal SSP; a source driver clock signal SCK; a gate driver start pulse signal GSP; and a gate driver clock signal GCK. Note that these signals are well-known, and therefore detailed descriptions thereof will be omitted. The display control circuit 180 also receives the image data signal DA, and supplies it to the source driver 130.

The source driver 130 receives the source driver start pulse signal SSP, the source driver clock signal SCK, and the image data signal DA from the display control circuit 180, and in accordance with these signals, the source driver 130 sequentially generates analog voltages, which are equivalent to pixel values on the horizontal scanning lines for the image represented by the image data signal DA, as data signals S(1) to S(n), which are applied to their respective source bus lines SL1 to SLn in the display portion 110.

The gate driver 140 receives the gate driver start pulse signal GSP, and the gate driver clock signal GCK from the display control circuit, and in accordance with these signals, the gate driver 140 sequentially selects each of the gate bus lines GL1 to GLm in the display portion 110 for one horizontal scanning period during each frame period (vertical scanning period) for displaying the image represented by the image data signal DA, and applies an active gate signal (a voltage to turn on the TFT 10) to the selected gate bus line.

As described above, the data signals S(1) to S(n) from the source driver 130 are applied to the source bus lines SL1 to SLn, respectively, and the gate signals G(1) to G(m) from the gate driver 140 are applied to the gate bus lines GL1 to GLm, respectively, so that a voltage according to a value for a corresponding pixel for the image represented by the image data signal DA is supplied to each pixel capacitance Cp in the display portion 110 via the TFT 10, and held therein. As a result, voltages corresponding to potential differences between the pixel electrodes and the common electrode EC are applied to the liquid crystal layer in accordance with the image data signal DA. The display portion 110 controls optical transmittance of the liquid crystal layer in accordance with the applied voltages to display the image represented by the image data signal DA received from the external signal source. The configurations of the display region 110 and the frame region 120 will be described next with reference to FIGS. 2 and 3.

<2. Configuration of the Dummy Pixel Portion>

Figure 2:
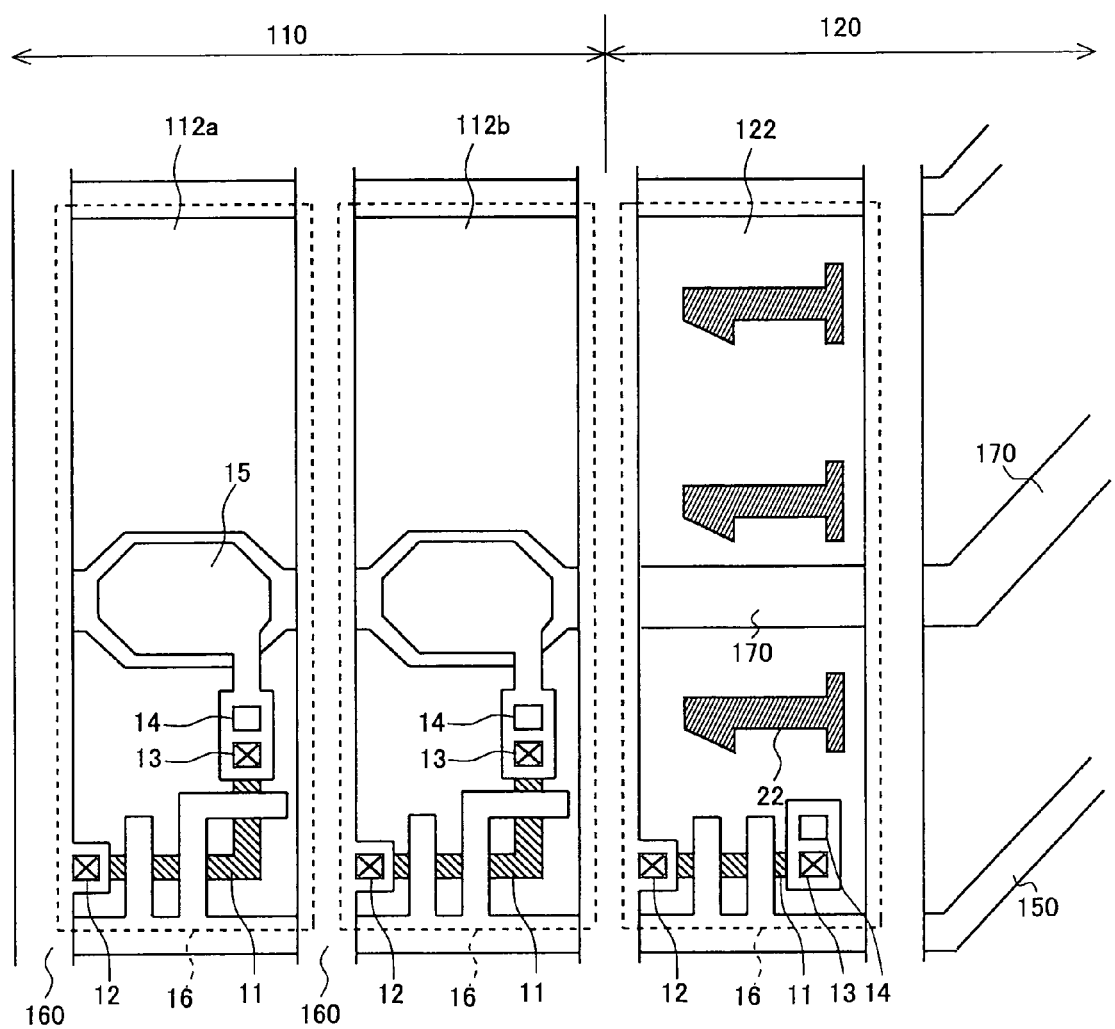
FIG. 2 is an enlarged top view illustrating a detailed configuration of an element board in the vicinity of the boundary between a display region and a frame region in the embodiment.
Figure 12:
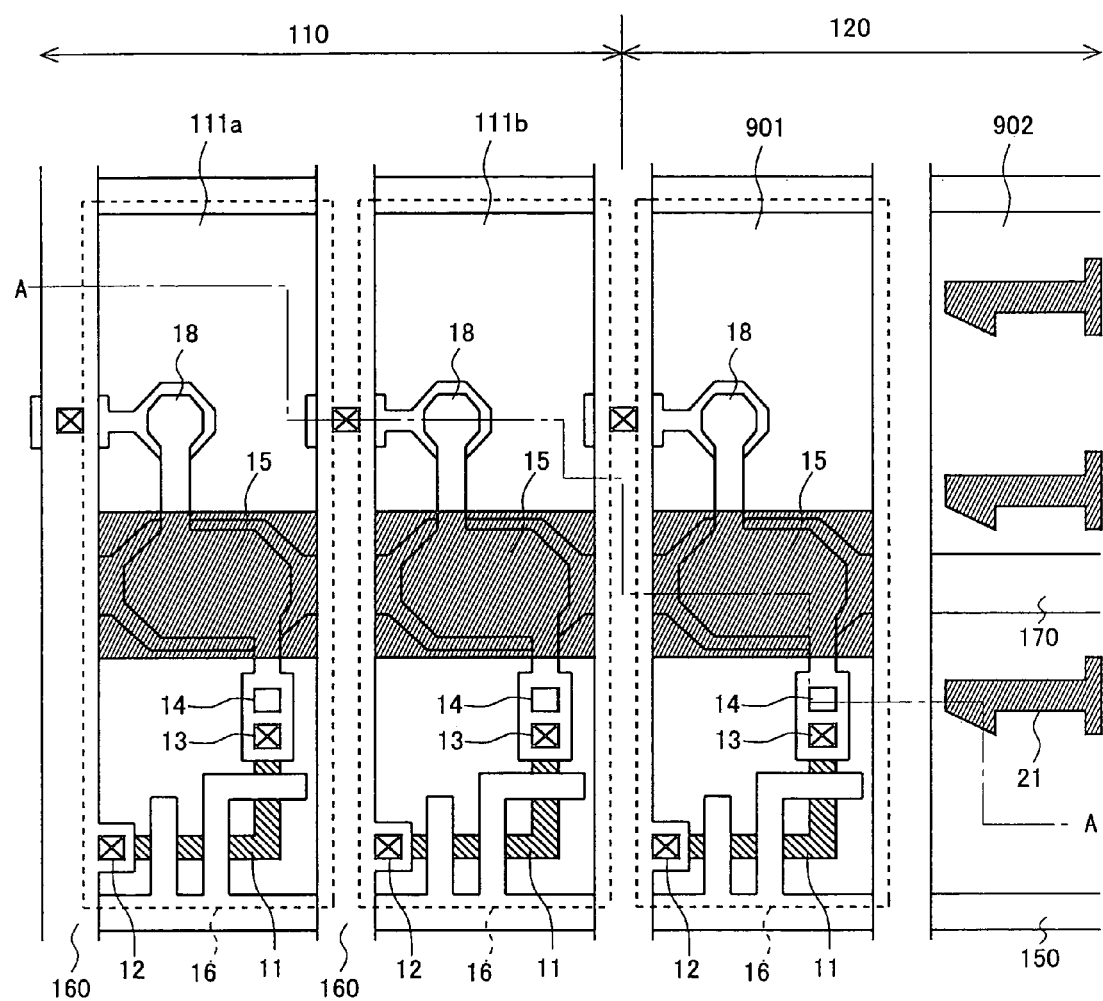
FIG. 12 is an enlarged top view illustrating the configuration of a portion of an element board of the conventional liquid crystal display device.

FIG. 2 is an enlarged top view as in FIG. 12, illustrating a detailed configuration of the element board 100 in the vicinity of the boundary between the display region 110 and the frame region 120. FIG. 2 shows two pixel formation portions 112a and 112b, which are provided in the display region 110 and have the same configuration, and a dummy pixel portion 122, which is provided in the frame region 120. Since the pixel formation portions 112a and 112b are configured in the same manner as the pixel formation portions 111a and 111b shown in FIG. 12, except that the reflective electrode 17 and the repair portion 18 are not included, the same elements are denoted by the same characters, and descriptions thereof will be omitted. The gate bus lines 150, the source bus lines 160, and the storage capacitance line 170 are also configured in the same manner as their counterparts, and therefore descriptions thereof will be omitted.

The dummy pixel portion 122 shown in FIG. 2 has the functions of both the dummy pixel portion 901 and the code notation portion 902 shown in FIG. 12, and includes a contact hole 12 identical to those of the pixel formation portions 112a and 112b, as well as a semiconductor layer 11, a contact hole 13, a through-hole 14, and a transparent electrode 16, which have the same functions as those in the pixel formation portions 112a and 112b but are formed in different positions. Note that the layered structure is the same as any one of the conventional layered structures as described earlier with reference to FIGS. 13A to 13D, and therefore any description thereof will be omitted.

Here, in the dummy pixel portion 122, a gate electrode of a thin film transistor formed by the semiconductor layer 11 is divided into two portions as shown in FIG. 2. By dividing the gate electrode into two portions, rather than three portions as in the pixel formation portions 112a and 112b, it becomes possible to form a transparent region (unused region) in the dummy pixel portion 122 to note a code 22.

Specifically, a source terminal of the thin film transistor at one end of the semiconductor layer 11 is connected to the source bus line 160 via the contact hole 12, and a drain terminal of the thin film transistor at the other end of the semiconductor layer 11 extends out of the contact hole 13 toward the display surface of the element board 100 (toward the counter board 200), and thereafter connected to the reflective electrode 17 via the through-hole 14. Therefore, by reducing the number of gate electrodes to two, it becomes possible to shorten the distances from the contact hole 12 to the contact hole 13 and to the through-hole 14. As a result, the positions in which to dispose the contact hole 13 and the through-hole 14 can be changed in the direction toward the bottom of FIG. 2 (i.e., the vicinity of the gate bus line 150 connected to the dummy pixel portion 122), making it possible to ensure a wide transparent region within an area from the vicinity of the center of the dummy pixel portion 122 to the contact hole 13 and the through-hole 14. In addition, with the above configuration, the thin film transistor of the dummy pixel portion 122 can have characteristics similar to those of the thin film transistors of the pixel formation portions 112a and 112b.

Note that even if the pixel formation portions 112a and 112b each have two gate electrodes, or four or more gate electrodes, by reducing the number of gate electrodes in the dummy pixel portion 122 to less than that number, it becomes possible to similarly ensure a wide transparent region. In addition, if the length and position of the semiconductor layer 11 can be changed by, for example, changing the position and size of the gate electrode in the dummy pixel portion 122, it becomes possible to similarly ensure a wide transparent region.

Furthermore, by providing the dummy pixel portion 122 with only one electrode that constitutes the storage capacitance line 170 from among two electrodes equivalent to the two electrodes included in the storage capacitance portion 15, it becomes possible to ensure a wide transparent region. Specifically, of the two electrodes included in the storage capacitance portion 15 in the pixel formation portion 112a, 112b, one is provided on the side facing the storage capacitance line 170 (the side closer to the counter board 200), and the electrode equivalent to that one electrode is omitted from the dummy pixel portion 122. The width of the other electrode, i.e., the storage capacitance line 170, in the dummy pixel portion 122 is reduced to the same width as a portion of the storage capacitance line 170 that extends outside the dummy pixel portion 122. Thus, it is possible to ensure a wide transparent region within an area between the gate bus lines 150 respectively provided at the top and bottom sides of the figure with respect to the storage capacitance line 170 in the vicinity of the center of the dummy pixel portion 122.

In the wide transparent region thus ensured, the code 22 of the same size as the conventional code 21 shown in FIG. 12 is noted. In FIG. 2, the number "111" is noted as the code 22.

Figure 13A:
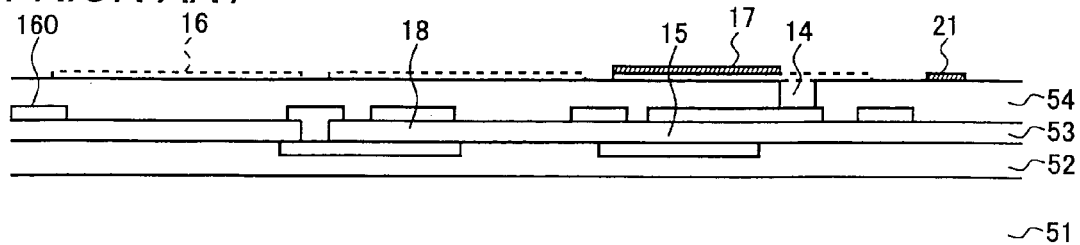
FIG. 13A is a schematic cross-sectional view illustrating pixel formation portions, a dummy pixel portion, and a code notation portion in a conventional example where a code is noted by a reflective electrode.
Figure 13B:
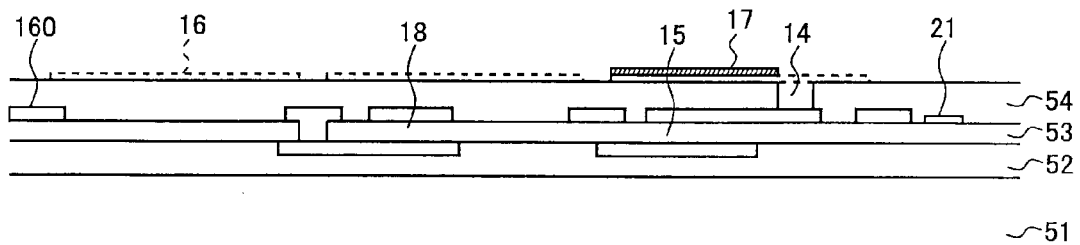
FIG. 13B is a schematic cross-sectional view illustrating the pixel formation portions, the dummy pixel portion, and the code notation portion in a conventional example where the code is noted by a source electrode.
Figure 13C:
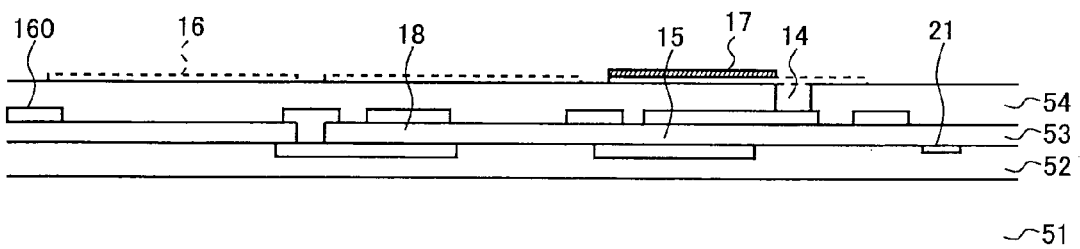
FIG. 13C is a schematic cross-sectional view illustrating the pixel formation portions, the dummy pixel portion, and the code notation portion in a conventional example where the code is noted by a gate electrode.
Figure 13D:
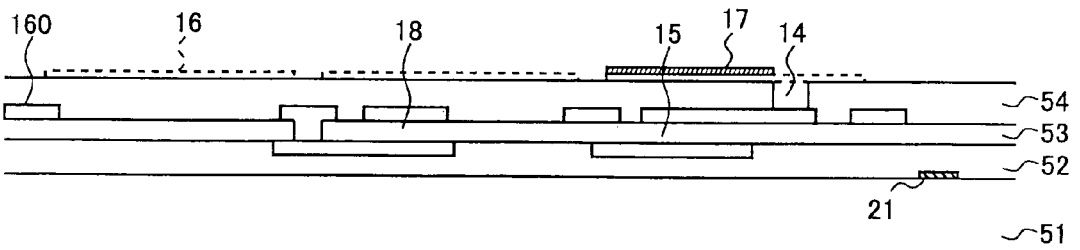
FIG. 13D is a schematic cross-sectional view illustrating the pixel formation portions, the dummy pixel portion, and the code notation portion in a conventional example where the code is noted by a semiconductor layer.

The code 22 is not made up of (the same material as) the reflective electrode as in the case shown in FIG. 13A, but (the same material as) any one of the following: the source electrode, the gate electrode, and the semiconductor layer 11, as shown in FIGS. 13B to 13D, and therefore assignment of the codes 22 will not increase the manufacture cost.

In addition, the dummy pixel portion 122 assigned with the code 22 as described above has the function of the code notation portion 902 shown in FIG. 12, and includes the thin film transistor as in the conventional dummy pixel portions, making it possible to prevent the pixel electrodes included in the pixel formation portions from being broken due to static charge. Furthermore, the dummy pixel portion 122 is positioned adjacent to one pixel formation portion, and has a conductor, which is formed so as to be spaced apart from pixel electrodes at the same distance as in other pixel formation portions, and therefore disposition of the dummy pixel portion will not change parasitic capacitances (between conductors or pixel electrodes) among the pixel formation portions. In addition, the dummy pixel portion 122 has a layered structure similar to that of the pixel formation portion 112b adjacent thereto, and therefore its vertical dimension (thickness) can be substantially the same as that of the display surface, so that the thickness of the liquid crystal layer (the cell gap) can be substantially uniform. Thus, the dummy pixel portion 122 has the same function as that of the conventional dummy pixel portion 901 shown in FIG. 12.

As such, the dummy pixel portion 122 has the functions of both the dummy pixel portion 901 and the code notation portion 902 shown in FIG. 12, and therefore the frame region 120 can be narrowed, so that the entire display device can be rendered compact.

In addition, by using a portion of the frame region 120 that is wider than in the conventional frame region (a region corresponding to the conventional code notation portion 902 shown in FIG. 12) as a region in which to bend (or lead around) wiring, such as the source bus line 160 and the gate bus line 150, without narrowing the frame region 120 (thereby rendering the entire display device particularly compact), it becomes possible to suitably position the source driver 130 and the gate driver 140 that are connected to the wiring.

Figure 3:
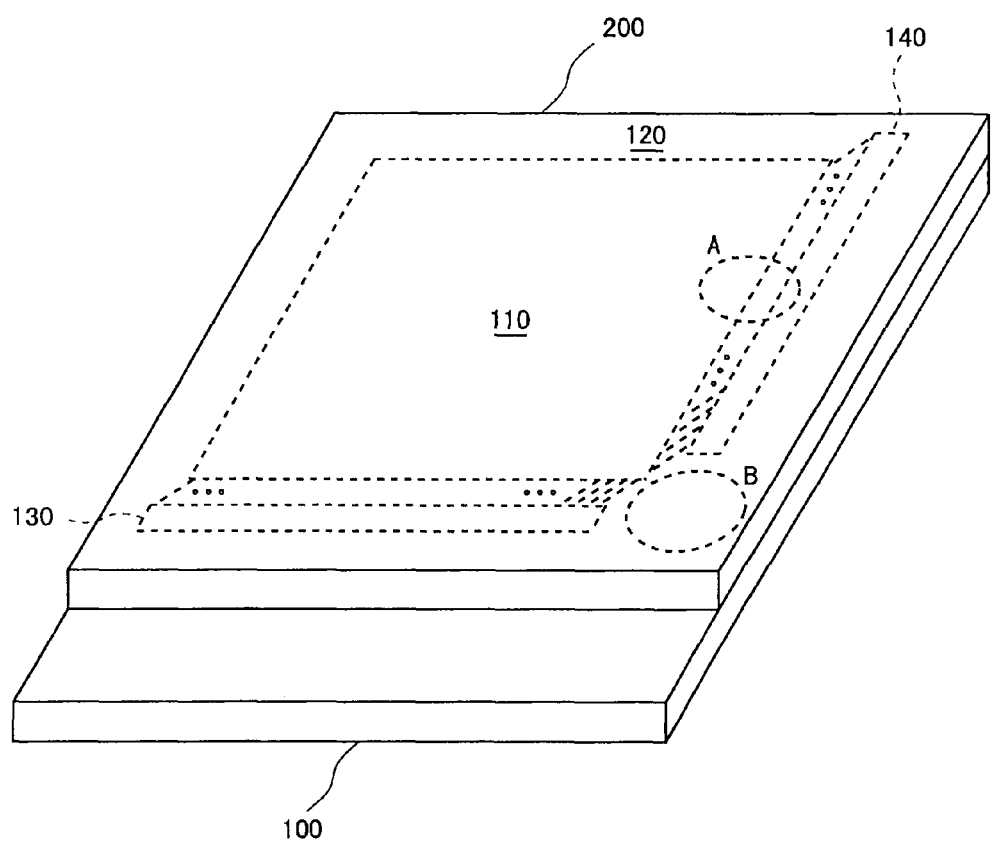
FIG. 3 is a view illustrating an example where a source driver and a gate driver in the embodiment are suitably positioned.

FIG. 3 is a view illustrating an example where the source driver 130 and the gate driver 140 are suitably positioned. As shown in FIG. 3, the source driver 130 is disposed in a lower portion of the figure when viewed from the display region 110, and displaced to the left side in the figure, so that the source bus lines are provided so as to bend downward to the left. In addition, the gate driver 140 is disposed on the right side in the figure, and displaced to the top side in the figure, so that the gate bus lines are provided so as to bend upward to the right. As such, the gate bus lines and the source bus lines can be provided in such a manner as to be bent (or led around), so that there is a wide extra region encircled by circle B shown in FIG. 3, which is not used as a region in which to form the source driver 130 and the gate driver 140. Accordingly, by forming any circuit or component for implementing a predetermined additional function in the wide extra region, it becomes possible to add a new function without increasing the size of the display device. Note that even if only one of the source driver 130 and the gate driver 140 is displaced as described above, a somewhat wide extra region as described above can be similarly provided, making it possible to add a new function without increasing the size of the display device.

<3. Effect>

As described above, in the present display device, the dummy pixel portions 122 having a function similar to that of the conventional dummy pixel portions are formed in the frame region 120, and the codes 22 of the same size as the conventional codes 21 are noted in the dummy pixel portions 122, so that the frame region required for the dummy pixel portions and code notation can be reduced in size. As a result, the degree of freedom in wiring layout of the frame region 120 during designing can be increased, leading to a greater degree of freedom in layout of various conductors and circuits, such as the source driver 130 and the gate driver 140, within the frame region 120. Thus, it is possible to add a new function without increasing the size of the display device.

<4. Variants>

<4.1 First Variant>

Next, a first variant of the embodiment of the present invention will be described with reference to FIG. 4. Unlike the display device according to the above embodiment, a display device according to the first variant does not effect a transmissive display, but only a reflective display. Accordingly, only the reflective electrode is used as the pixel electrode of each pixel formation portion, and no transparent electrode is used. However, configurations and operations of an equivalent circuit of the display portion and other elements are similar to those in the embodiment shown in FIG. 1. In addition, the pixel formation portions of the display device according to the first variant are configured in the same manner as in the embodiment shown in FIG. 2, except that no transparent electrode is included as described above. Therefore, the same elements are denoted by the same characters, and descriptions thereof will be omitted.

Figure 4:
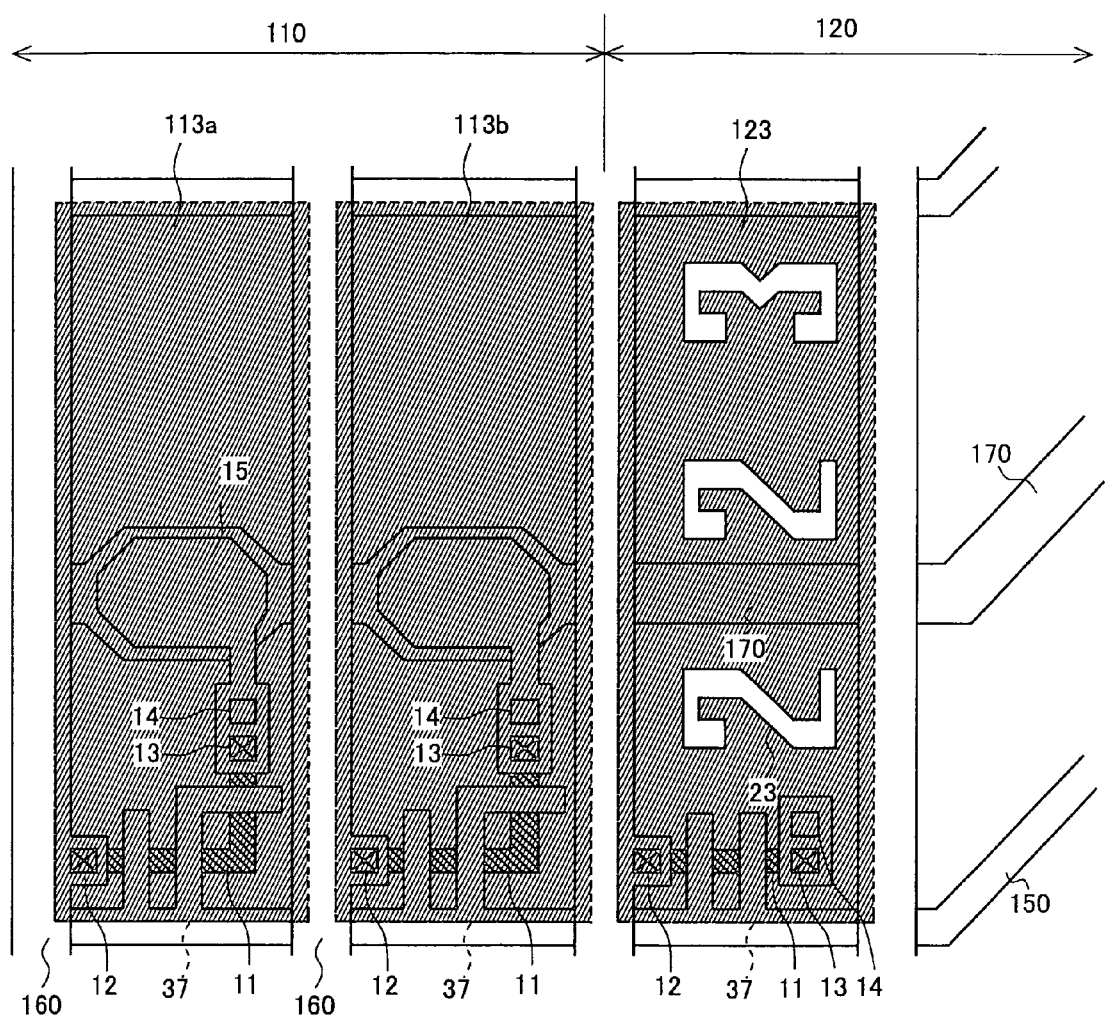
FIG. 4 is an enlarged top view illustrating a detailed configuration of the element board in the vicinity of the boundary between the display region and the frame region in a first variant of the embodiment.

FIG. 4 is an enlarged top view as in FIG. 2, illustrating a detailed configuration of the element board 100 in the vicinity of the boundary between the display region 110 and the frame region 120 in the first variant. FIG. 4 shows two pixel formation portions 113a and 113b, which are provided in the display region 110 and have the same configuration, and a dummy pixel portion 123, which is provided in the frame region 120. Since the pixel formation portions 113a and 113b are configured in the same manner as the pixel formation portions 112a and 112b shown in FIG. 2, except that the transparent electrode 16 is omitted, and instead, the entire pixel formation portion is covered only by a reflective electrode 37, descriptions thereof will be omitted. In addition, the gate bus lines 150, the source bus lines 160, and the storage capacitance line 170 are also configured in the same manner as their counterparts, and therefore descriptions thereof will be omitted.

The dummy pixel portion 123 shown in FIG. 4 includes a semiconductor layer 11, a contact hole 13, and a through-hole 14, which are the same as those in the dummy pixel portion 122 shown in FIG. 2, and the dummy pixel portion 123 also includes the reflective electrode 37 made up of a reflective electrode material, which differs in shape from, but is the same as, that for the pixel formation portions 113a and 113b. Note that the layered structure is the same as any one of the conventional layered structures as described earlier with reference to FIGS. 13A to 13D, and therefore any description thereof will be omitted.

Also, in the dummy pixel portion 123, a gate electrode of a thin film transistor formed by the semiconductor layer 11 is divided into two portions, rather than into three portions as in the pixel formation portions 113a and 113b, so that as in the case of the dummy pixel portion 122, an unused region (corresponding to the transparent region of the dummy pixel portion 122) in which to note a code 23 can be formed in the dummy pixel portion 123.

Furthermore, only an electrode equivalent to the storage capacitance line 170 is provided in the dummy pixel portion 123, i.e., of the two electrodes included in the storage capacitance portion 15 in the pixel formation portion 113a, 113b, one is provided on the side facing the storage capacitance line 170 (the side closer to the counter board 200), and an electrode equivalent to that one electrode is omitted from the dummy pixel portion 123. Thus, it is possible to ensure a wide unused region as in the dummy pixel portion 122.

The code 23 of the same size as the conventional code 21 shown in FIG. 12 is noted in the wide unused region thus ensured. The code 23 is formed using the reflective electrode as in the case shown in FIG. 13A, but the code 23 itself is not formed by the reflective electrode, and is noted by the reflective electrode 37 having some portions removed (cut out) to form the shape of the code 23 as shown in FIG. 4. As such, the code 23 is formed using the reflective electrode 37 for the reflective display, and therefore assignment of the codes 23 will not increase the manufacture cost.

As with the conventional dummy pixel portions, the dummy pixel portion 123 assigned with the code 23 makes it possible to prevent the pixel electrodes included in the pixel formation portions from being broken due to static charge, as well as to prevent parasitic capacitances in the pixel formation portions from being changed, while making the thickness of the liquid crystal layer (the cell gap) substantially uniform. Thus, as with the dummy pixel portions 122, the dummy pixel portions 123 make it possible to narrow the frame region 120, thereby making the entire display device compact.

In addition, by using a portion of the frame region 120 that is wider than that in the conventional frame region as a region in which to bend wiring, such as the source bus lines 160 and the gate bus lines 150, without narrowing the frame region 120, it becomes possible to suitably position the source driver 130 and the gate driver 140 that are connected to the wiring, and by forming any circuit or component for implementing a predetermined additional function in an extra region thus generated, it becomes possible to add a new function without increasing the size of the display device.

As such, by forming the dummy pixel portions 123 having the same function as the conventional dummy pixel portions in the frame region 120 of the present display device, and noting the codes 23 of the same size as the conventional codes 21 in the dummy pixel portions 123, it becomes possible to reduce the size of the frame region required for the dummy pixel portions and code notation.

<4.2 Second Variant>

Next, a second variant of the embodiment of the present invention will be described with reference to FIG. 5. As with the display device according to the above embodiment, a display device according to the second variant effects a transmissive display, and the configurations and operations of an equivalent circuit of the display portion and other elements are the same as those in the embodiment shown in FIG. 1. In addition, the configurations of pixel formation portions of the display device are the same as in the embodiment shown in FIG. 2, except that a repair portion 18 is included as in the conventional display device. Therefore, the same elements are denoted by the same characters, and descriptions thereof will be omitted.

Figure 5:
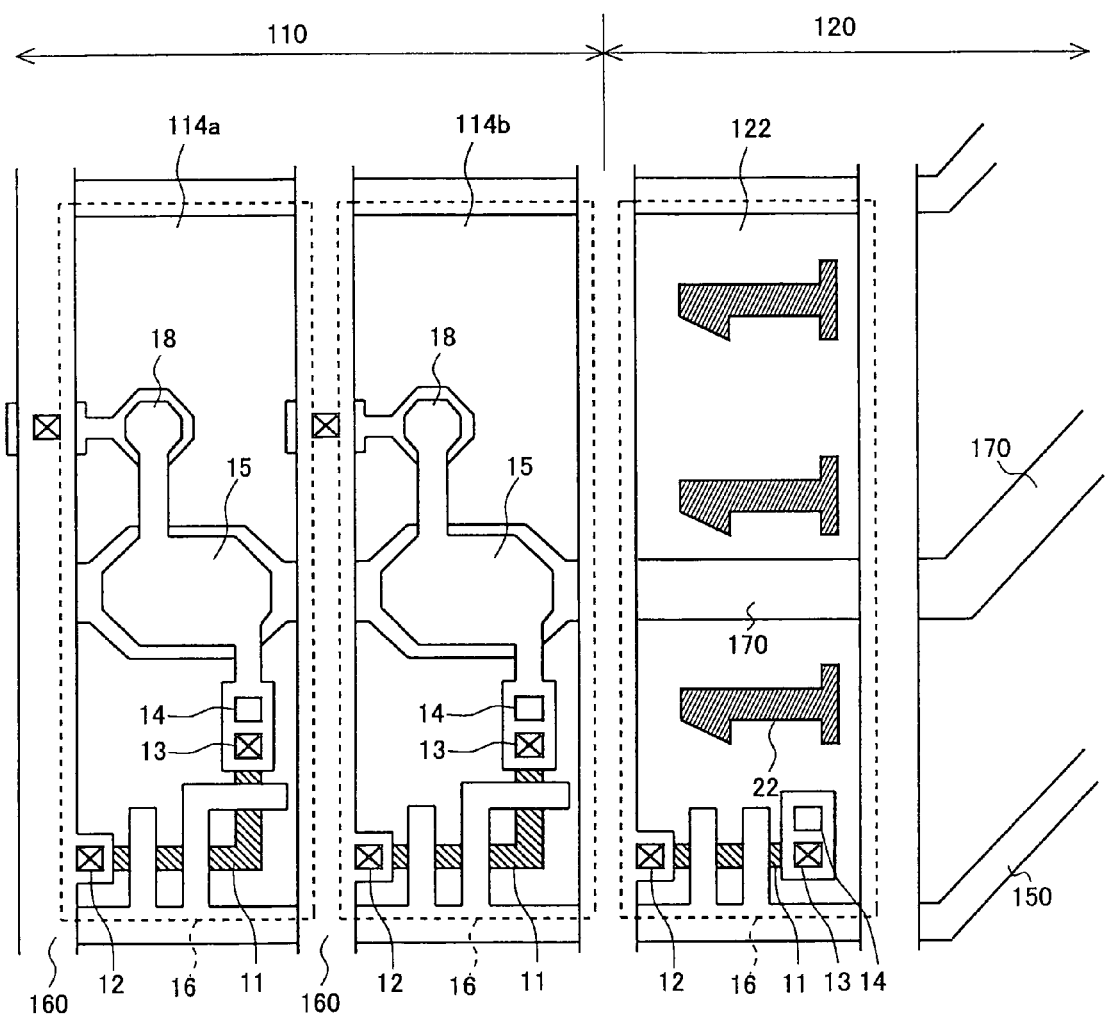
FIG. 5 is an enlarged top view illustrating a detailed configuration of the element board in the vicinity of the boundary between the display region and the frame region in a second variant of the embodiment.

FIG. 5 is an enlarged top view as in FIG. 2, illustrating a detailed configuration of the element board 100 in the vicinity of the boundary between the display region 110 and the frame region 120 in the second variant. FIG. 5 shows two pixel formation portions 114a and 114b, which are provided in the display region 110 and have the same configuration, and a dummy pixel portion 122, which is provided in the frame region 120. The pixel formation portions 114a and 114b are configured in the same manner as the pixel formation portions 112a and 112b shown in FIG. 2, except that the same repair portion 18 as the conventional repair portion 18 shown in FIG. 12 is included. Also, the gate bus lines 150, the source bus lines 160, and the storage capacitance line 170 are configured in the same manner as their counterparts, and therefore descriptions thereof will be omitted.

Here, the repair portion 18 is provided to repair any defect of the pixel formation portion that has occurred during manufacture, but the repair portion 18 is not limited to that composed of a pair of electrodes having a predetermined insulating layer sandwiched therebetween. For example, a switching means, such as a backup transistor, or a cut or connected end portion of a conductor, can be used so long as such an element is provided to change the wiring in the pixel formation portion.

Furthermore, since the dummy pixel portion 122 shown in FIG. 5 is configured in the same manner as the dummy pixel portion 122 shown in FIG. 2, the same elements are denoted by the same characters, and descriptions thereof will be omitted. Here, the dummy pixel portion 122 does not include any repair portion 18 as included in the pixel formation portions 114a and 114b, but this does not adversely affect the function of the dummy pixel portion. The reason for this is that the repair portion 18 repairs any defect of the pixel formation portion that has occurred during manufacture by changing the defective pixel formation portion that appears as a bright spot into a black spot, thereby making the display defect less noticeable, and therefore the repair portion 18 is not required by the dummy pixel portion that is not involved in effecting a display. In addition, parasitic capacitances in the pixel formation portions do not change significantly even if the repair portion 18 is omitted.

As such, by forming the dummy pixel portions 122 having the same function as the conventional dummy pixel portions in the frame region 120 of the present display device, and noting the codes 22 of the same size as the conventional codes 21 in the dummy pixel portions 122, it becomes possible to reduce the size of the frame region required for the dummy pixel portions and code notation.

<4.3 Third Variant>

Next, a third variant of the embodiment of the present invention will be described with reference to FIG. 6. As with the conventional display device shown in FIG. 12, a display device according to the third variant effects a semi-transmissive display. Configurations and operations of an equivalent circuit of the display portion and other elements are the same as those in the embodiment shown in FIG. 1. In addition, the configuration of pixel formation portions of the display device is the same as that in the embodiment shown in FIG. 2, except that a repair portion 18 and a reflective electrode 17 are included as in the conventional pixel formation portions. Therefore, the same elements are denoted by the same characters, and descriptions thereof will be omitted.

Figure 6:
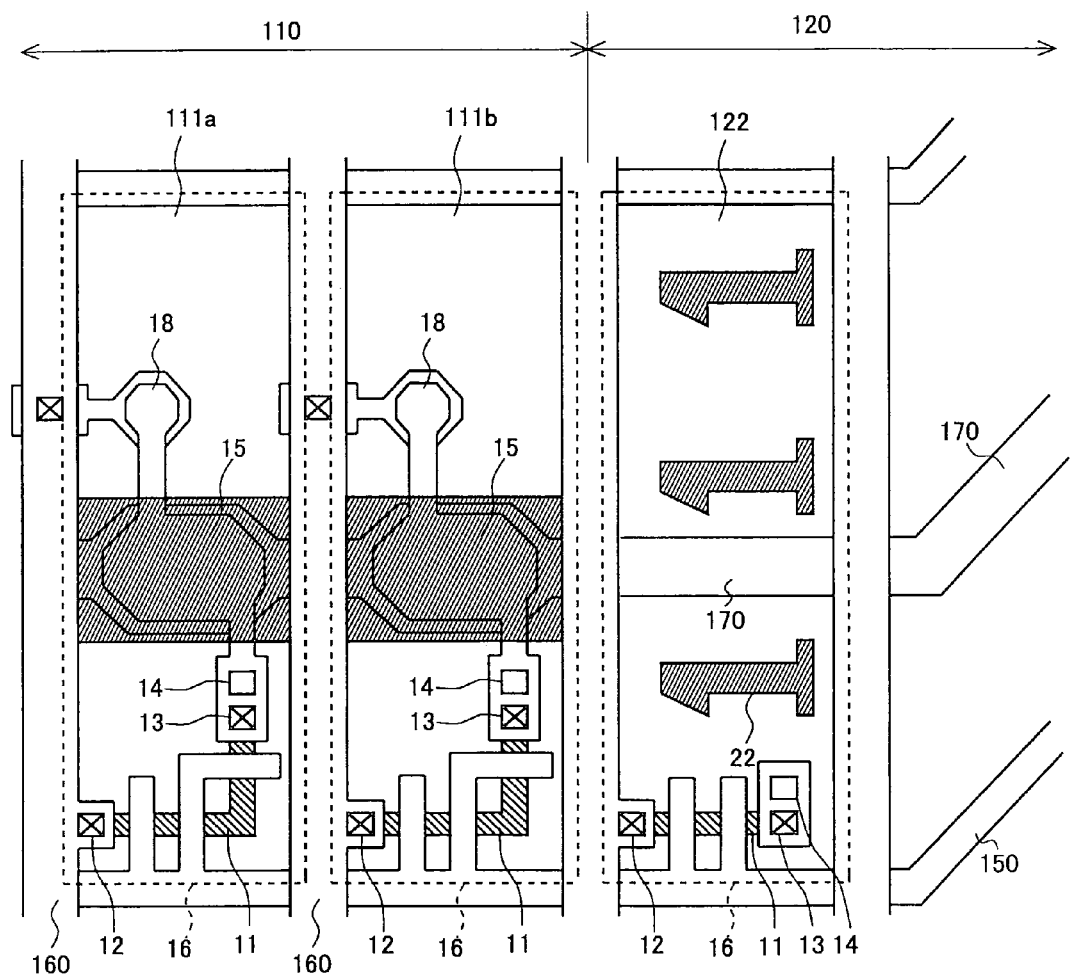
FIG. 6 is an enlarged top view illustrating a detailed configuration of the element board in the vicinity of the boundary between the display region and the frame region in a third variant of the embodiment.

FIG. 6 is an enlarged top view as in FIG. 2, illustrating a detailed configuration of the element board 100 in the vicinity of the boundary between the display region 110 and the frame region 120 in the third variant. FIG. 6 shows two pixel formation portions 111a and 111b, which are provided in the display region 110 and have the same configuration, and a dummy pixel portion 122, which is provided in the frame region 120. The pixel formation portions 111a and 111b are configured in the same manner as the conventional pixel formation portions 111a and 111b shown in FIG. 12, and the gate bus lines 150, the source bus lines 160, and the storage capacitance line 170 are configured in the same manner as their counterparts, and therefore descriptions thereof will be omitted.

Furthermore, since the dummy pixel portion 122 shown in FIG. 6 is configured in the same manner as the dummy pixel portion 122 shown in FIG. 2, the same elements are denoted by the same characters, and descriptions thereof will be omitted. However, a code 22 of the dummy pixel portion 122 may differ from that in the first variant, and may be formed by the reflective electrode as in the conventional dummy pixel portion as shown in FIG. 13A. Note that as described above, no adverse effect is made to the function of the dummy pixel portion even if the dummy pixel portion 122 is not provided with the repair portion 18.

As such, by forming the dummy pixel portions 122 having the same function as the conventional dummy pixel portions in the frame region 120 of the present display device, and noting the codes 22 of the same size as the conventional codes 21 in the dummy pixel portions 122, it becomes possible to reduce the size of the frame region required for the dummy pixel portions and code notation.

<4.4 Fourth Variant>

Next, a fourth variant of the embodiment of the present invention will be described with reference to FIG. 7. As with the conventional display device shown in FIG. 12, a display device according to the fourth variant effects a semi-transmissive display. Configurations and operations of an equivalent circuit of the display portion and other elements are the same as those in the embodiment shown in FIG. 1, and pixel formation portions of the display device are configured in the same manner as in the embodiment shown in FIG. 2, except that a repair portion 18 and a reflective electrode 47 are provided as in the conventional pixel formation portions. Therefore, the same elements are denoted by the same characters, and descriptions thereof will be omitted.

Figure 7:
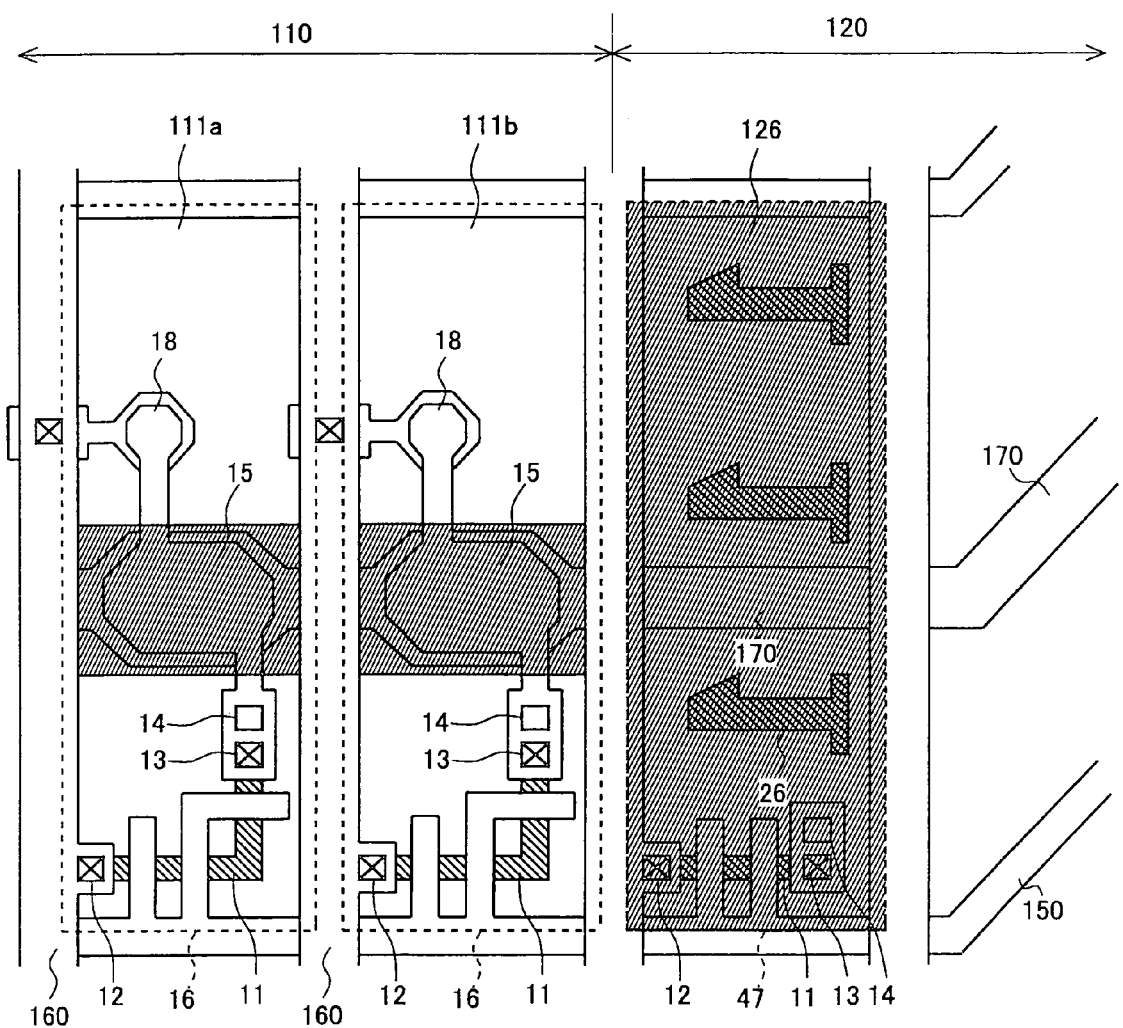
FIG. 7 is an enlarged top view illustrating a detailed configuration of the element board in the vicinity of the boundary between the display region and the frame region in a fourth variant of the embodiment.

FIG. 7 is an enlarged top view as in FIG. 2, illustrating a detailed configuration of the element board 100 in the vicinity of the boundary between the display region 110 and the frame region 120 in the fourth variant. FIG. 7 shows two pixel formation portions 111a and 111b, which are provided in the display region 110 and have the same configuration, and a dummy pixel portion 126, which is provided in the frame region 120. Since the pixel formation portions 111a and 111b are configured in the same manner as the conventional pixel formation portions 111a and 111b shown in FIG. 12, and the gate bus lines 150, the source bus lines 160, and the storage capacitance line 170 are configured in the same manner as their counterparts, descriptions thereof will be omitted.

The dummy pixel portion 126 shown in FIG. 7 includes a semiconductor layer 11, a contact hole 13, and a through-hole 14, which are the same as those of the dummy pixel portion 122 shown in FIG. 2, and the dummy pixel portion 126 also includes the reflective electrode 47 made up of a reflective electrode material, which differs in shape from, but is the same as, that for the pixel formation portions 111a and 111b. Note that the layered structure is the same as any one of the conventional layered structures as described earlier with reference to FIGS. 13A to 13D, and therefore any description thereof will be omitted.

A code 26 of the same size as the conventional code 21 shown in FIG. 12 is formed in an unused region of the dummy pixel portion 126. The code 26 is made up of (the same material as) any of the following: the source electrode, the gate electrode, and the semiconductor layer 11 as shown in FIGS. 13B to 13D, but unlike in these figures, the reflective electrode 47 is formed so as to cover the entire surface of the dummy pixel portion 126 when viewed from the counter board 200 side. Accordingly, the code 26 cannot be seen from the side facing the counter board 200, due to blockage by the reflective electrode 47. However, as described above, the code 26 is formed in the unused region, and therefore can be seen from the side opposite to the side facing the counter board 200. Accordingly, the code 26 shown in FIG. 7 is formed in a mirror-inverted shape when viewed from the side facing the counter board 200, such that the code 26 is correctly noted when viewed from the side opposite to the side facing the counter board 200. In addition, as described above, assignment of the codes 26 will not increase the manufacture cost. Note that as described above, no adverse effect is made to the function of the dummy pixel portions even if no repair portion 18 is provided in the dummy pixel portions 126.

As such, by forming the dummy pixel portions 126 having the same function as the conventional dummy pixel portions in the frame region 120 of the present display device and noting the codes 26 of the same size as the conventional codes 21 in the dummy pixel portions 126, it becomes possible to reduce the size of the frame region required for the dummy pixel portions and code notation.

<4.5 Fifth Variant>

Next, a fifth variant of the embodiment of the present invention will be described with reference to FIG. 8. As with the display device according to the embodiment shown in FIG. 2, a display device according to the fifth variant effects a transmissive display. Configurations and operations of an equivalent circuit of the display portion and other elements are the same as in the embodiment shown in FIG. 1, and pixel formation portions of the display device are also configured in the same manner as in the embodiment shown in FIG. 2. Therefore, the same elements are denoted by the same characters, and descriptions thereof will be omitted.

Figure 8:
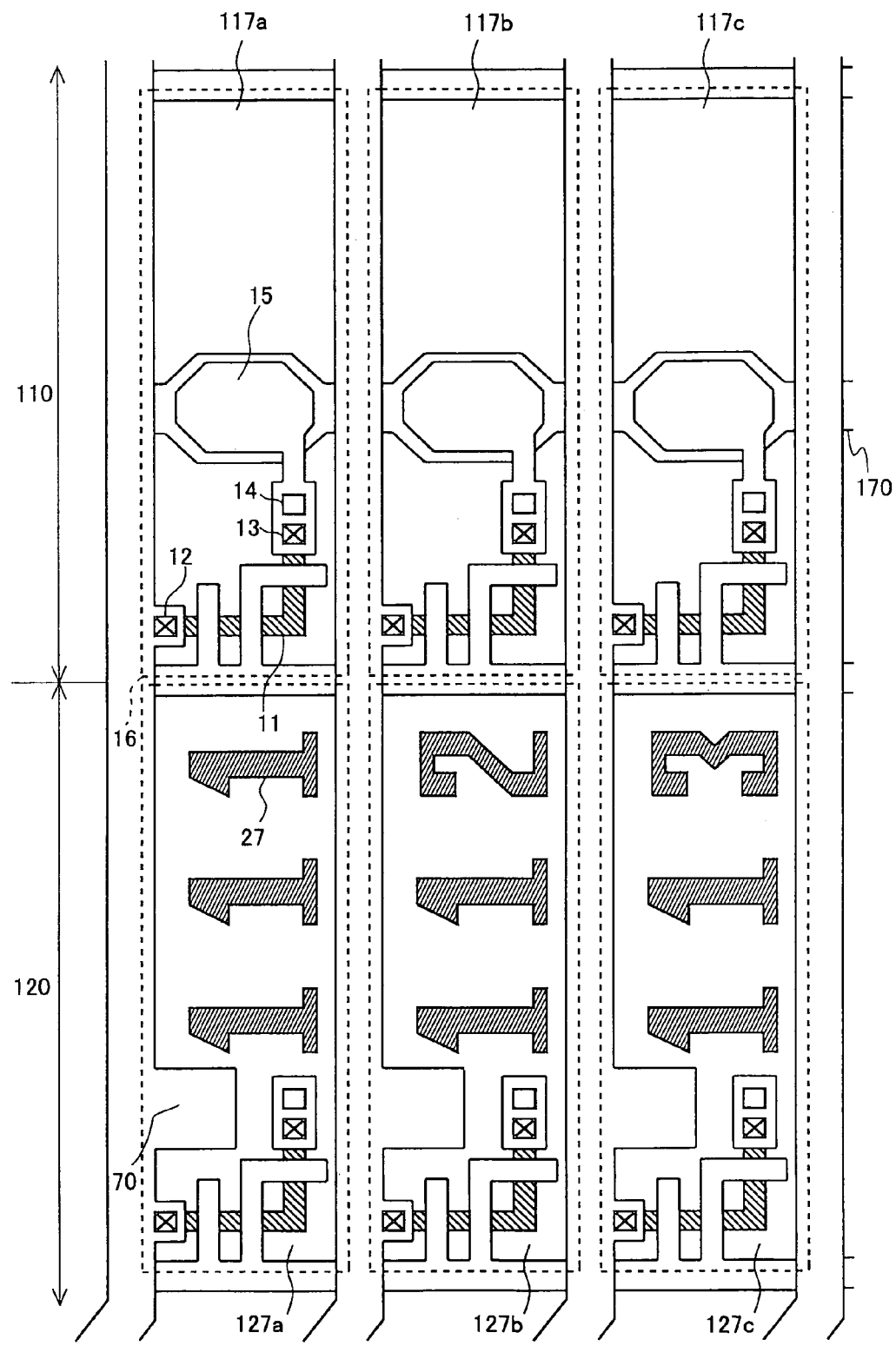
FIG. 8 is an enlarged top view illustrating a detailed configuration of the element board in the vicinity of the boundary between the display region and the frame region in a fifth variant of the embodiment.

FIG. 8 is an enlarged top view illustrating a detailed configuration of the element board 100 in the vicinity of the boundary between the display region 110 and the frame region 120, as well as in the vicinity of the source driver 130, in the fifth variant. FIG. 8 shows three pixel formation portions 117a, 117b, and 117c, which are provided in the display region 110 and have the same configuration, and three dummy pixel portions 127a, 127b, and 127c, which are provided in the frame region 120 and have the same configuration. Since the pixel formation portions 117a, 117b, and 117c are configured in the same manner as the pixel formation portions 112a and 112b in the embodiment shown in FIG. 2, and the gate bus lines 150, the source bus lines 160, and the storage capacitance line 170 are also configured in the same manner as their counterparts, descriptions thereof will be omitted.

The dummy pixel portions 127a, 127b, and 127c shown in FIG. 8 include a semiconductor layer 11, a contact hole 12, a contact hole 13, a through-hole 14, and a transparent electrode 16, which are the same as those of the pixel formation portions 117a, 117b, and 117c. Note that the layered structure is the same as any one of the conventional layered structures as described earlier with reference to FIGS. 13A to 13D, and therefore any description thereof will be omitted.

Here, in each of the dummy pixel portions 127a, 127b, and 127c, a gate electrode of a thin film transistor formed by the semiconductor layer 11 is divided into three portions as in the pixel formation portions 117a, 117b, and 117c as shown in FIG. 8. As a result, the distances from the contact hole 12 to the contact hole 13 and to the through-hole 14 cannot be shortened, and therefore, unlike in the embodiment, the positions in which to dispose the contact hole 13 and the through-hole 14 cannot be changed, so that no unused region can be formed in this regard.

However, unlike in the above embodiment, two electrodes included in a storage capacitance portion 15 provided in each of the pixel formation portions 117a and 117b, 117c, one of the electrodes being equivalent to the storage capacitance line 170, are both omitted in the dummy pixel portions 127a, 127b, and 127c shown in FIG. 8. As a result, in each of the dummy pixel portions 127a, 127b, and 127c, a wide transparent region (unused region) can be ensured within an area between the gate bus line 150 and the through-hole 14, which are respectively provided at the top and bottom sides in the figure with respect to the vicinity of the center of the dummy pixel portion. Note that the storage capacitance portion 15 including the electrode that is equivalent to the storage capacitance line 170 is used only for effecting displays, and therefore the dummy pixel portions 127a, 127b, and 127c (and all other dummy pixel portions provided side by side in the same row) are dispensable, and may be omitted. Even if they are omitted, no problem will be incurred because substantially no change is made to parasitic capacitances in the pixel formation portions adjacent to the dummy pixel portions in the same column.

The code 27 of substantially the same size as the conventional code 21 shown in FIG. 12 is noted in the wide transparent region thus ensured. Unlike in the case shown in FIG. 13A, the code 27 is not composed of the reflective electrode, but it is made up of (the same material as) one of the following: the source electrode, the gate electrode, and the semiconductor layer 11 as shown in FIGS. 13B to 13D, and therefore assignment of the codes 27 will not increase the manufacture cost.

In addition, unlike in other variants and the above embodiment, the dummy pixel portions 127a, 127b, and 127c in the present variant include a pad portion 70. The pad portion 70 is provided in the form of a rectangle continuing from a portion of the source bus line 160 in an unused region in the vicinity of the contact hole 13 and the through-hole 14. A signal for a well-known test or evaluation analysis is externally inputted/outputted to/from the pad portion 70 via a needle-like probe in contact therewith. The pad portion 70 is formed in the unused region within the dummy pixel portions 127a, 127b, and 127c, and it is not necessary to form it in a dedicated area newly defined in the frame region 120 outside the dummy pixel portion as required in the case of the conventional pad portions. Therefore, with this configuration, it becomes possible to narrow the frame region 120, thereby rendering the entire display device compact.

Although the pad portion 70 is formed in continuation with a portion of the source bus line 160, it may be formed in continuation with a portion of the gate bus line 150, or in electrical connection with the contact hole 13. In addition, two or more of them may be formed.

As such, by forming the dummy pixel portions 127a, 127b, and 127c having the same function as the conventional dummy pixel portions in the frame region 120 of the present display device, and noting the code 27 of the same size as the conventional code 21 in the dummy pixel portions 127a, 127b, and 127c, it becomes possible to reduce the size of the frame region required for the dummy pixel portions and code notation. Furthermore, by forming the pad portion 70 in the dummy pixel portions 127a, 127b, and 127c, it becomes possible to reduce the size of the frame region required for pad formation.

<4.6 Sixth Variant>

Next, a sixth variant of the embodiment of the present invention will be described with reference to FIG. 9. As with the display device according to the embodiment shown in FIG. 2, a display device according to the sixth variant is an active-matrix display device, but there is a difference in that, instead of providing thin film transistors, thin-film diodes, which are known as switching elements similar to the thin film transistors, are provided on the element board 100. The thin-film diodes each have a so-called MIM (metal-insulator-metal) structure consisting of upper and lower metal electrodes, and an insulating layer sandwiched therebetween. Note that the details of the structure are well-known, and therefore any description thereof will be omitted.

In addition, no gate bus lines are present on the element board 100, and a plurality of parallel scanning electrodes, which are equivalent to the gate bus lines, are formed on the counter board 200. The scanning electrodes are provided so as to perpendicularly cross signal electrodes formed on the element board 100, which are equivalent to the source bus lines. When a predetermined selection signal is applied to the scanning electrodes, so that corresponding thin-film diodes are selected, a voltage corresponding to a voltage applied between each of the scanning electrodes and a predetermined signal electrode is applied between the lower electrodes connected to their respective signal electrodes and the upper electrodes connected to their respective pixel electrodes. The applied voltage is written onto the thin-film diodes, so that electric charge corresponding thereto is accumulated in the liquid crystal layer. The optical transmittance of the liquid crystal layer is controlled in accordance with the applied voltage to display an image represented by an image data signal received from an external signal source.

Figure 9:
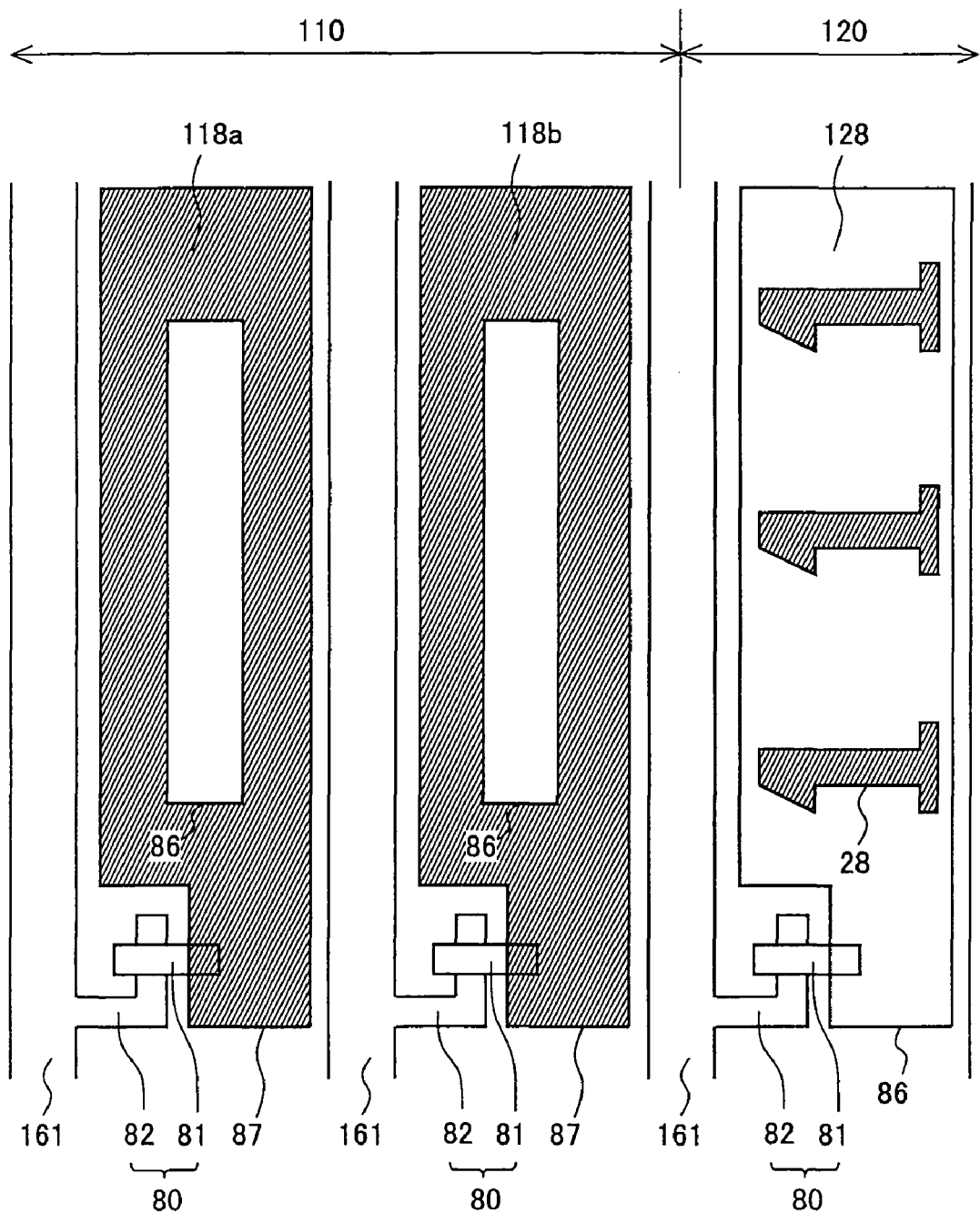
FIG. 9 is an enlarged top view illustrating a detailed configuration of the element board in the vicinity of the boundary between the display region and the frame region in a sixth variant of the embodiment.

FIG. 9 is an enlarged top view illustrating a detailed configuration of the element board 100 in the vicinity of the boundary between the display region 110 and the frame region 120 in the sixth variant. FIG. 9 shows two pixel formation portions 118a and 118b, which are provided in the display region 110 and have the same configuration, and a dummy pixel portion 128, which is provided in the frame region 120.

The pixel formation portions 118a and 118b include a thin-film diode 80, which includes an upper electrode 81 and a lower electrode 82, as well as a transparent electrode 86 and a reflective electrode 87, which are pixel electrodes. The present display device effects a semi-transmissive display by the transparent electrodes 86 and the reflective electrodes 87.

The dummy pixel portion 128 shown in FIG. 9 includes a thin-film diode 80 including an upper electrode 81 and a lower electrode 82, which are the same as those of the pixel formation portions 118a and 118b, as well as a code 28 and a transparent electrode 86, but the reflective electrode 87 is omitted. This configuration allows the code 28 to be viewed from the side facing the counter board 200, without being blocked by the reflective electrode 87. In addition, the code 28 is made up of the same material as the upper electrode 81, the lower electrode 82, or the reflective electrode 87, simultaneously therewith. Thereby, assignment of the codes 28 will not increase the manufacture cost.

As such, by forming the dummy pixel portions 128 having the same function as the conventional dummy pixel portions in the frame region 120 of the present display device, and noting the codes 28 of the same size as the conventional codes 21 in the dummy pixel portions 128, it becomes possible to reduce the size of the frame region required for the dummy pixel portions and code notation.

<4.7 Seventh Variant>

Next, a seventh variant of the embodiment of the present invention will be described with reference to FIG. 10. Unlike the display device according to the embodiment shown in FIG. 2, a display device according to the seventh variant is a simple matrix display device. Since the overall structure of the display device is the same as the structure shown in FIG. 11, the same elements are generally denoted by the same characters, and descriptions thereof will be omitted.

A plurality of parallel scanning electrodes are formed on the counter board 200 of the display device, and a plurality of parallel signal electrodes are formed on the element board 100 so as to perpendicularly cross each of the scanning electrodes. In accordance with voltages applied between the scanning electrodes and the signal electrodes, the optical transmittance of the liquid crystal layer is controlled to display an image represented by an image data signal received from an external signal source.

Figure 10:
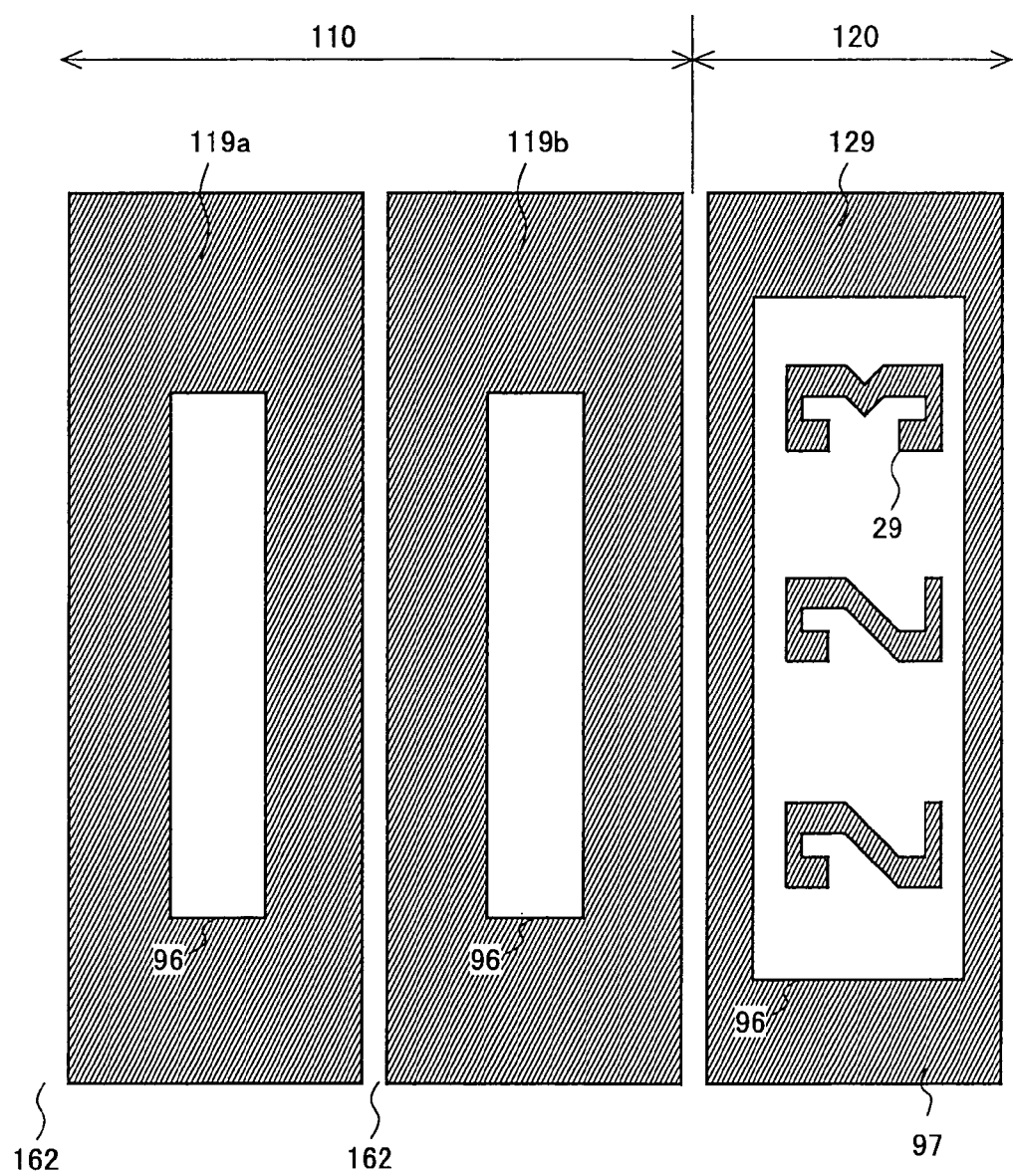
FIG. 10 is an enlarged top view illustrating a detailed configuration of the element board in the vicinity of the boundary between the display region and the frame region in a seventh variant of the embodiment.

FIG. 10 is an enlarged top view illustrating a detailed configuration of the element board 100 in the vicinity of the boundary between the display region 110 and the frame region 120 in the seventh variant. FIG. 10 shows two pixel formation portions 119a and 119b, which are provided in the display region 110 and have the same configuration, and a dummy pixel portion 129, which is provided in the frame region 120. Note that the dummy pixel portion 129 is not provided with any switching element, and therefore differs from general dummy pixel portions, but the dummy pixel portion 129 has a function in common with the general dummy pixel portions, in that the cell gap can be cancelled as will be described later.

The pixel formation portions 119a and 119b include a transparent electrode 96 and a reflective electrode 97, which are pixel electrodes. The present display device effects a semi-transmissive display by the transparent electrodes 96 and the reflective electrodes 97. The above configuration is the same as that in the sixth variant as described above.

However, unlike in the configuration according to the sixth variant, the dummy pixel portion 129 shown in FIG. 10 includes a transparent electrode 96 and a reflective electrode 97. A code 29 is structured by appropriately positioning the reflective electrode 97 in the transparent electrode 96. This configuration allows the code 29 to be viewed from the side facing the counter board 200, without being blocked by the reflective electrode 97, and even if the pixel formation portions are engaged in a reflective display or transmissive display, the code 29 is viewable. Furthermore, the code 29 is structured by the reflective electrode 97, and therefore assignment of the codes 29 will not increase the manufacture cost. Note that the fifth variant can be configured in the same manner as the present variant, and the present variant can be configured without the reflective electrodes 97 as in the fifth variant.

However, it has been known that, in the case of the STN (super twisted nematic) mode liquid crystal orientation, which is often employed by simple matrix liquid crystal display devices, display unevenness is readily caused due to nonuniform cell gaps. If the code 29 is formed only by the transparent electrode 96, a cell gap is created due to a difference in electrode film thickness from the pixel formation portion 119b including the reflective electrode 97 disposed in its peripheral portion. Thus, as shown in FIG. 10, the code 29 is formed by disposing the reflective electrode 97 and the transparent electrode 96, respectively, in a peripheral portion of the dummy pixel portion 129 and in the substantial center thereof, as well as by disposing an opaque material, such as the reflective electrode 97, in the electrode 96, it becomes possible to cancel the cell gap due to the difference in electrode film thickness, and thereby to prevent display unevenness.

In view of the above, when the STN-mode liquid crystal orientation is employed in the fifth variant (or other examples), the code 28 (or another code) is desirably structured with the reflective electrode 97 being disposed in its peripheral portion as in the case of the code 29 in the present variant.

<4.8 Other Variants>

The liquid crystal display devices according to the present embodiment and the variants thereof use liquid crystal for their display portions, but any display devices, which use electro-optical elements, such as organic EL (electro luminescence) elements, or LEDs (light emitting diodes), instead of using liquid crystal, may be applicable.

In the case of the liquid crystal display devices according to the present embodiment and the variants thereof, one or more electrodes that are equivalent to two electrodes included in the storage capacitance are omitted in the dummy pixel portions, and the number of gate electrodes is reduced, so that the semiconductor layer 11 can be shortened, making it possible to change the positions of the contact hole 13 and the through-hole 14 and thereby to form the unused region in which to note the code (or dispose the pad portion). However, with or without use of such a configuration, the unused region may be formed in the dummy pixel portions by narrowing the electrode width of the gate or source bus line in the dummy pixel portions. Also, in recent years, a memory circuit for memorizing potentials provided in the pixel formation portion, and a sensor circuit for implementing the function of a scanner or touch sensor are formed in some cases. In such cases, the function of the dummy pixel portion is not compromised even if such circuits are eliminated from the dummy pixel portion, and therefore the unused region may be formed by eliminating the circuits.

In the case of the liquid crystal display devices according to the present embodiment and the variants thereof, the codes are formed on the element board 100, but they may be formed on the counter board 200, using a thin film material (e.g., a color filter) for the counter board 200. However, in order not to cause conductors and circuits that are formed on the element board 100 to partially or completely cover the codes formed on the counter board 200, it is necessary to form the unused region according to the above-described configuration, e.g., one or more electrodes that are equivalent to two electrodes included in the storage capacitance are omitted in the dummy pixel portion, or the positions of the contact hole 13 and the through-hole 14 are changed. It is also necessary to form the codes within their respective predetermined regions on the counter board 200 that are positioned to face their corresponding unused regions formed on the element board 100.

INDUSTRIAL APPLICABILITY

The present invention is directed to display devices. More specifically, the present invention is applicable to display devices in which liquid crystal elements or EL elements are disposed in the form of a matrix, and it is well-suited for liquid crystal display devices mounted in a variety of types of electronic equipment, particularly, such flat-panel display device as to be mounted in mobile electronic equipment.

The invention claimed is:

1. A display device comprising an element board and a counter board, the element board including:
   a plurality of data signal lines for transmitting a plurality of data signals;
   a plurality of scanning signal lines crossing the data signal lines;
   a plurality of pixel formation portions disposed in a matrix form, the pixel formation portions being provided in a vicinity of their respective intersections between the plurality of data signal lines and the plurality of scanning signal lines crossing the data signal lines; and
   a plurality of dummy pixel portions, each being disposed adjacent to an outermost one of the pixel formation portions, the counter board being provided so as to be opposed to the element board, such that electro-optical elements for effecting a display are sandwiched between the counter board and the element board,
   wherein the pixel formation portions each include a storage capacitance portion having two electrodes for holding a potential in accordance with a signal supplied from a corresponding one of the data signal lines,
   wherein the dummy pixel portions include at least one component equivalent to any one of a plurality of light blocking effect components for forming a predetermined circuit included in the pixel formation portions, and an area of the component included in the dummy pixel portion, when viewed from a position substantially vertically away from a principal surface of the element board, is smaller than that of each of the components included in the pixel formation portions, and the dummy pixel portions include an electrode equivalent to one of the two electrodes included in the storage capacitance portion, the electrode included in the dummy pixel portions has a smaller area than that of the one electrode included in the pixel formation portion,
   wherein the dummy pixel portions each include a code notation portion in which to note a predetermined code, and
   wherein the component included in the dummy pixel portions is disposed so as not to prevent notation of the code.

2. The display device according to claim 1,
   wherein the pixel formation portions each include any one or more of the following components: a repair portion by which to change wiring in the circuit; a predetermined memory circuit; and a predetermined sensor circuit, and
   wherein the dummy pixel portions include none of the following: the repair portion, the memory circuit, and the sensor circuit, as included in the pixel formation portions.

3. The display device according to claim 1,
   wherein one of the components included in the pixel formation portions is a semiconductor layer for forming a predetermined first thin film transistor, and
   wherein the component included in the dummy pixel portions is another semiconductor layer having a smaller area than that of the semiconductor layer, and the dummy pixel portions each include a second thin film transistor formed by the smaller semiconductor layer.

4. The display device according to claim 3,
   wherein the first thin film transistor includes a plurality of gate electrodes, and
   wherein the second thin film transistor includes a lesser number of gate electrodes than the number of gate electrodes in the first thin film transistor.

5. The display device according to claim 1,
   wherein the one electrode included in the pixel formation portion is a storage capacitance line.

6. The display device according to claim 1,
   wherein the components included in the pixel formation portions are a semiconductor layer, a gate electrode, and a source electrode that form a predetermined thin film transistor, and
   wherein the notation of the code by the code notation portion is achieved by forming one of the following into a predetermined shape: another semiconductor layer simultaneously formed with the semiconductor layer; an electrode simultaneously formed with the gate electrode; and an electrode simultaneously formed with the source electrode.

7. The display device according to claim 1,
   wherein one of the components included in the pixel formation portions is a reflective electrode for effecting a reflective display, and
   wherein the notation of the code by the code notation portion is achieved by forming an electrode of a predetermined shape, simultaneously with the reflective electrode.

8. The display device according to claim 1,
   wherein the counter board includes code notation portions in which to note a predetermined code within a region overlapping the dummy pixel portions when viewed from a position substantially vertically away from a principal surface of the counter board, and
   wherein the component included in the dummy pixel portions is disposed so as not to prevent notation of the code.

9. The display device according to claim 1, wherein the dummy pixel portions are coupled to either the data signal lines or the scanning signal lines, or both, and include a pad portion by which to externally input/output a predetermined signal to/from the device.

10. The display device according to claim 1, further comprising a data signal line drive circuit for supplying the plurality of data signals to their respective data signal lines,
    wherein the data signal line drive circuit is connected to conductors which are connected to their respective data signal lines, and extend out of an end of their respective dummy pixel portions after being bent at a predetermined angle in a direction in which the data signal lines extend.

11. The display device according to claim 1, further comprising a scanning signal line drive circuit for supplying a predetermined selection signal to the scanning signal lines,
    wherein the scanning signal line drive circuit is connected to conductors, which are connected to their respective scanning signal lines, and extend out of an end of their respective dummy pixel portions after being bent at a predetermined angle in a direction in which the scanning signal lines extend.

12. A display device comprising an element board and a counter board, the element board including:
    a plurality of data signal lines for transmitting a plurality of data signals;
    a plurality of scanning signal lines crossing the data signal lines;
    a plurality of pixel formation portions disposed in a matrix form, and
    a plurality of dummy pixel portions, each being disposed adjacent to an outermost one of the pixel formation portions, the counter board being provided so as to be opposed to the element board, such that electro-optical elements for effecting a display are sandwiched between the counter board and the element board, wherein the pixel formation portions each include a storage capacitance portion having two electrodes for holding a potential in accordance with a signal supplied from a corresponding one of the data signal lines, wherein the dummy pixel portions include at least one component equivalent to any one of a plurality of light blocking effect components for forming a predetermined circuit included in the pixel formation portions, and an area of the component included in the dummy pixel portion, when viewed from a position substantially vertically away from a principal surface of the element board, is smaller than that of each of the components included in the pixel formation portions, and the dummy pixel portions include none of two electrodes equivalent to the two electrodes included in the storage capacitance portion, wherein the dummy pixel portions each include a code notation portion in which to note a predetermined code, and wherein the component included in the dummy pixel portions is disposed so as not to prevent notation of the code.

13. A display device comprising an element board and a counter board, the element board including:
  a plurality of data signal lines for transmitting a plurality of data signals;
  a plurality of scanning signal lines crossing the data signal lines;
  a plurality of pixel formation portions disposed in a matrix form; and
  a plurality of dummy pixel portions, each being disposed adjacent to an outermost one of the pixel formation portions, the counter board being provided so as to be opposed to the element board, such that electro-optical elements for effecting a display are sandwiched between the counter board and the element board, wherein components included in the pixel formation portions are first semiconductor layer, first gate electrode, first drain electrode, and first source electrode that form a predetermined first thin film transistor, wherein the dummy pixel portions include a plurality of components equivalent to any one of a plurality of light blocking effect components for forming a predetermined circuit included in the pixel formation portions, and an area of the component included in the dummy pixel portion, when viewed from a position substantially vertically away from a principal surface of the element board, is smaller than that of each of the components included in the pixel formation portions, wherein the components included in the dummy pixel portions are second semiconductor layer, second gate electrode, second drain electrode, and second source electrode that form a predetermined second thin film transistor, wherein the second gate electrode is smaller than the first gate electrode, the second drain electrode is smaller than the first drain electrode, or the second source electrode is smaller than the first source electrode, wherein the dummy pixel portions each include a code notation portion in which to note a predetermined code, and wherein the component included in the dummy pixel portions is disposed so as not to prevent notation of the code.

14. The display device according to claim 13, wherein the pixel formation portions each include any one or more of the following components: a repair portion by which to change wiring in the circuit; a predetermined memory circuit; and a predetermined sensor circuit, and wherein the dummy pixel portions include none of the following: the repair portion, the memory circuit, and the sensor circuit, as included in the pixel formation portions.

15. The display device according to claim 13, wherein the second semiconductor layer has a smaller area than that of the first semiconductor layer.

16. The display device according to claim 15, wherein a number of the second gate electrodes is lesser than that of the first gate electrodes.

17. The display device according to claim 13, wherein the notation of the code by the code notation portion is achieved by forming one of the following into a predetermined shape: the second semiconductor layer simultaneously formed with the first semiconductor layer; the second gate electrode simultaneously formed with the first gate electrode; the second drain electrode simultaneously formed with the first drain electrode; and the second source electrode simultaneously formed with the first source electrode.

18. The display device according to claim 13, wherein one of the components included in the pixel formation portions is a reflective electrode for effecting a reflective display, and wherein the notation of the code by the code notation portion is achieved by forming an electrode of a predetermined shape, simultaneously with the reflective electrode.

19. The display device according to claim 13, wherein the counter board includes code notation portions in which to note a predetermined code within a region overlapping the dummy pixel portions when viewed from a position substantially vertically away from a principal surface of the counter board, and wherein the component included in the dummy pixel portions is disposed so as not to prevent notation of the code.

20. The display device according to claim 13, wherein the dummy pixel portions are coupled to either the data signal lines or the scanning signal lines, or both, and include a pad portion by which to externally input/output a predetermined signal to/from the device.

21. The display device according to claim 13, further comprising a data signal line drive circuit for supplying the plurality of data signals to their respective data signal lines, wherein the data signal line drive circuit is connected to conductors which are connected to their respective data signal lines, and extend out of an end of their respective dummy pixel portions after being bent at a predetermined angle in a direction in which data signal lines extend.

22. The display device according to claim 13, further comprising a scanning signal line drive circuit for supplying a predetermined selection signal to the scanning signal lines, wherein the scanning signal line drive circuit is connected to conductors, which are connected to their respective scanning signal lines, and extend out of an end of their respective dummy pixel portions after being bent at a predetermined angle in a direction in which the scanning signal lines extend.

23. A display device comprising an element board and a counter board, the element board including:
  a plurality of data signal lines for transmitting a plurality of data signals;

a plurality of scanning signal lines crossing the data signal lines;

a plurality of pixel formation portions disposed in a matrix form; and a plurality of dummy pixel portions, each being disposed adjacent to an outermost one of the pixel formation portions, the counter board being provided so as to be opposed to the element board, such that electro-optical elements for effecting a display are sandwiched between the counter board and the element board, wherein components included in the pixel formation portions are first semiconductor layer, first gate electrode, first drain electrode, and first source electrode that form a predetermined first thin film transistor, wherein the dummy pixel portions include at least one component equivalent to any one of a plurality of light blocking effect components for forming a predetermined circuit included in the pixel formation portions, and an area of the component included in the dummy pixel portion, when viewed from a position substantially vertically away from a principle surface of the element board, is smaller than that of each of the components included in the pixel formation portions, wherein the component included in the dummy pixel portions is any one or more of the following components that form a predetermined second thin film transistor: second semiconductor layer; second gate electrode; second drain electrode; and second source electrode, wherein the dummy pixel portions each include a code notation portion in which to note a predetermined code, and wherein the component included in the dummy pixel portions is disposed so as not to prevent notation of the code.

24. A display device comprising an element board and a counter board, the element board including:

a plurality of data signal lines for transmitting a plurality of data signals;

a plurality of scanning signal lines crossing the data signal lines;

a plurality of pixel formation portions disposed in a matrix form, and a plurality of dummy pixel portions, each being disposed adjacent to an outermost one of the pixel formation portions, the counter board being provided so as to be opposed to the element board, such that electro-optical elements for effecting a display are sandwiched between the counter board and the element board, wherein the pixel formation portions each include a storage capacitance portion having two electrodes for holding a potential in accordance with a signal supplied from a corresponding one of the data signal lines, and wherein the dummy pixel portions include at least one component equivalent to any one of a plurality of light blocking effect components for forming a predetermined circuit included in the pixel formation portions, and an area of the component included in the dummy pixel portion, when viewed from a position substantially vertically away from a principal surface of the element board, is smaller than that of each of the components included in the pixel formation portions, and the dummy pixel portions include one of two electrodes equivalent to the two electrodes included in the storage capacitance portion, wherein the dummy pixel portions each include a code notation portion in which to note a predetermined code, and wherein the component included in the dummy pixel portions is disposed so as not to prevent notation of the code.

* * * * *